United States Patent [19]

Hayashida

[11] Patent Number: 5,744,927
[45] Date of Patent: Apr. 28, 1998

[54] INVERTER CONTROL METHOD AND APPARATUS

[75] Inventor: Takahiro Hayashida, Aichi, Japan

[73] Assignee: Mitsubishi Denki Kabushiki Kaisha, Tokyo, Japan

[21] Appl. No.: 374,873

[22] Filed: Jan. 19, 1995

[30] Foreign Application Priority Data

Jan. 28, 1994 [JP] Japan .................................. 6-008872

[51] Int. Cl.⁶ .................................................. H02P 7/63
[52] U.S. Cl. .......................... 318/599; 318/811; 388/805; 388/812
[58] Field of Search .......................... 318/599, 807–811; 388/805, 812, 814, 820, 832, 804, 811

[56] References Cited

U.S. PATENT DOCUMENTS

| | | | |
|---|---|---|---|
| 5,248,926 | 9/1993 | Kotake et al. | 318/807 |
| 5,343,382 | 8/1994 | Hale et al. | 318/599 X |

FOREIGN PATENT DOCUMENTS

| | | | |
|---|---|---|---|
| 0105215 | 4/1984 | European Pat. Off. . | |
| 0163746 | 11/1984 | European Pat. Off. | H02M 7/48 |
| 0293915 | 12/1988 | European Pat. Off. . | |
| 0436138 | 7/1991 | European Pat. Off. . | |
| 60-20782 | 2/1985 | Japan . | |
| 61-203893 | 9/1986 | Japan . | |
| 61-207197 | 9/1986 | Japan . | |
| 62-138068 | 6/1987 | Japan . | |
| 63-302787 | 12/1988 | Japan . | |
| 64-34196 | 2/1989 | Japan . | |
| 382396 | 4/1991 | Japan . | |
| 4127898 | 4/1992 | Japan . | |
| 4156297 | 5/1992 | Japan . | |
| 4210797 | 7/1992 | Japan . | |
| 5115106 | 5/1993 | Japan . | |
| 1083568 | 9/1967 | United Kingdom . | |
| 1120477 | 7/1968 | United Kingdom . | |
| 1242311 | 1/1969 | United Kingdom . | |
| 1490740 | 12/1974 | United Kingdom . | |
| 1383941 | 2/1975 | United Kingdom . | |
| 2143999 | 2/1985 | United Kingdom . | |
| 2155260 | 9/1985 | United Kingdom . | |
| 2162707 | 2/1986 | United Kingdom . | |
| 2190805 | 11/1987 | United Kingdom . | |
| 2237943 | 5/1991 | United Kingdom . | |

OTHER PUBLICATIONS

Abstract of JP-62-77895 (Mitsubishi).
Abstract of JP-5-49298 (Matsushita).
Abstract of JP-4-295278 (Mitsubishi).
Abstract of JP-3-178565 (Toshiba).

*Primary Examiner*—Brian Sircus
*Attorney, Agent, or Firm*—Sughrue, Mion, Zinn, Macpeak & Seas, PLLC

[57] ABSTRACT

An inverter control apparatus and method for a motor driven by an inverter circuit. The primary current of the motor is detected by a detector circuit and is used in combination with a primary current command value to provide pulse-width modulation of the inverter circuit. The inverter is controlled by a switching circuit that can change the PWM frequency based on any one or more factors, including motor speed, motor speed or position control mode, equivalent load factor and detected temperature.

15 Claims, 23 Drawing Sheets

INVERTER CONTROL METHOD AND APPARATUS

BACKGROUND OF THE INVENTION

1. Field of the Invention

The present invention relates to the improvement of an inverter control apparatus and method for driving a motor.

2. Description of the Background Art

For ease of understanding, a vector-controlled inverter control apparatus for driving an induction motor (hereinafter referred to as the "inverter control apparatus") will be described hereafter by way of example.

FIGS. 25, 26, 27 and 28 show a conventional current control type vector-controlled inverter control apparatus. FIG. 25 is a major arrangement diagram, FIG. 26 is a vector control block diagram, FIG. 27 is a PWM operation principle diagram, and FIGS. 28(a)–28(b-3) are outline drawings of an inverter control apparatus.

In FIG. 25, the numeral 1 indicates a three-phase alternating-current power supply, 2 designates a rectification circuit consisting of diodes, etc., which obtains a direct-current voltage from the three-phase alternating-current power supply 1, 3 denotes a direct-current voltage smoothing filter, 4 represents an inverter circuit constituted by switching devices such as transistors, 5 indicates an induction motor (hereinafter referred to as the "motor") acting as a load, 6 denotes a speed detector which detects the speed of the motor 5, 7 represents a speed command circuit which provides the speed basis of the motor 5, 8 designates a vector control operation circuit which operates on the primary current command value I* of the motor 5 according to a deviation between the command value $\omega r^*$ of the speed command circuit 7 and the detection output $\omega r$ of the speed detector 6, 9 indicates a current detector which detects the primary current detection value I of the motor 5, 10 represents a pulse width modulation control circuit (hereinafter referred to as the "PWM circuit") which generates a signal to switch on-off the switching devices of the inverter circuit 4 depending on a deviation between said primary current command value I* and primary current detection value I, and 11 designates a heat sink which dissipates heat generated by the devices installed in the rectification circuit 2 and the inverter circuit 4.

In the above arrangement, the internal arrangement of the vector control operation circuit 8 will now be described according to the vector control block diagram in FIG. 26. In this drawing, 81 indicates an arithmetic amplifier which amplifies the difference between the command value $\omega r^*$ of the speed command circuit 7 and the detection value $\omega r$ of the speed detector 6 and outputs a current command value for torque Iq*, 82 designates a secondary magnetic flux pattern generator which generates a secondary magnetic flux command value $\Phi 2^*$ according to the detection value $\omega r$ of the speed detector 6, 83 denotes an arithmetic circuit which generates an estimated secondary magnetic flux $\Phi 2$ and an exciting current component command value Id* according to the output of the secondary magnetic flux pattern generator 82, 84 represents a primary current amplitude generator which generates a primary current amplitude value |I*| according to the current command value for torque Iq* and exciting current component command value Id*, 85 indicates a torque argument arithmetic circuit which does arithmetic on a torque argument $\theta^*$ from the current command value for torque Iq* and exciting current component command value Id*, 86 denotes a slip frequency command arithmetic circuit which operates on a slip frequency command $\omega s^*$ from said current command value for torque Iq* and estimated secondary magnetic flux $\Phi 2$, and 87 represents a primary current command arithmetic circuit which performs arithmetic on the primary current command value I* according to an inverter frequency command $\omega 0$ comprised of the output |I*| of the primary current amplitude generator 84, the output $\theta^*$ of the torque argument arithmetic circuit 85, and the sum of the output $\omega s^*$ of the slip frequency command arithmetic circuit 86 and the output $\omega r$ of the speed detector 6. The above circuits constitute the vector control operation circuit 8.

In this arrangement, the internal arrangement of the PWM circuit 10 will now be described according to the PWM operation principle diagram in FIG. 27. In this drawing, 1001 indicates $\Delta I$ or a deviation between the primary current command value I* and the primary current detection value I, 1002 represents a triangular wave for chopping $\Delta I$, and 1003 designates a switching signal which switches ON if $\Delta I$ is greater than the triangular wave and switches OFF if $\Delta I$ is less than the triangular wave as a result of comparison between said $\Delta I$ and triangular wave. The cycle of this triangular wave is generally called a PWM frequency and is hereinafter referred to as the "fpwm". The devices, such as the power transistors installed in the inverter circuit 4, (hereinafter referred to as the "switching devices") are switched on-off under the control of this switching signal 1003.

FIGS. 28(a)–28(d) are outline drawings of an inverter control apparatus containing said arrangement. In these drawings, reference numerals 11a, 11b and 11c indicate heat sinks, 12 denotes an electrical circuit, and 13 represents a cooling fan. When the load or motor is driven by the inverter control apparatus, the fpwm is generally set to approximately 3 KHz. Being within the audible range of man, however, this frequency of approximately 3 KHz causes an offensive noise during motor operation. To reduce or almost eliminate this noise, the fpwm is often set to the outside of man's audible range or approximately 10 KHz–20 KHz. Also when the motor is run at very fast speeds (approximately 50000 rpm or higher), the fpwm must be set to a higher value (approximately 5 KHz–10 KHz) than normal to maintain control performance as described below because of the higher frequency of the motor current. In these drawings, FIG. 28(a) shows the outline of an inverter control apparatus where the fpwm is approximately 3 KHz, and FIGS. 28(b), 28(c) and 28(d) show the outlines of an inverter control apparatus where the fpwm is approximately 5 KHz–20 KHz. As the fpwm becomes larger, the switching loss of the switching devices in the inverter circuit 4 rises and the amount of heat generated increases. Accordingly, the heat sinks 11b, 11c must be made larger in size than the heat sink 11a shown in FIG. 28(b) and 28(c), or the cooling fan 13 must be installed outside, as shown in FIG. 28(d), to improve the heat dissipation capability.

SUMMARY OF THE INVENTION

In the above-mentioned conventional inverter control apparatus which drives a motor, when the motor is to be driven with low noise, the fpwm is set to a much higher value than normal. Also when the motor is to be driven at very fast revolutions, the fpwm is set to a higher value than normal. Conventionally, as countermeasures against the increase of heat generated by the switching device due to the fpwm which was always set to a higher value as described above, the heat sink of the inverter control apparatus was made larger or an additional cooling fan was installed outside. Hence, when the motor was to be driven with low noise or at very fast revolutions, the outline of the inverter control apparatus enlarged or the costs thereof increased.

It is accordingly an object of the present invention to overcome the above problems by providing a motor driving inverter control apparatus which does not require a large size and outline and does not result in an increase in cost when a motor is driven with low noise or at very fast revolutions.

In accomplishing the above objects, the motor driving inverter control apparatus concerned with the present invention has one or more of the following features:

(1) Low speed-high speed PWM switching, provided by a means which switches the fpwm between the low-speed and high-speed ranges of the motor;

(2) Constant torque-constant output PWM switching provided by a means which switches the fpwm between the constant torque characteristic region and constant output region of the motor and sets the fpwm with the function of speed in the constant output region;

(3) Acceleration/deceleration-steady state PWM switching provided by a means which sets the fpwm to a higher value only during motor acceleration/deceleration;

(4) Speed-position PWM switching provided by a means which sets the fpwm to a higher value only in position loop operation;

(5) Equivalent load factor PWM switching provided by a means which operates on a motor load factor and can vary the fpwm according to that load factor;

(6) Heat sink-ambient temperature difference PWM switching provided by a means which detects the temperature of a heat sink and the ambient temperature of the inverter control apparatus and can vary the fpwm according to a difference therebetween;

(7) Switching by a means which selects between fixing and varying the fpwm; and (8) Shutting off the gates of switching devices once when the fpwm is switched.

BRIEF DESCRIPTION OF THE DRAWINGS

In the above drawings, parts in the several embodiments of the invention that are identical to those of the conventional art are identified by identical reference characters.

DESCRIPTION OF THE PREFERRED EMBODIMENTS

Figure 1:
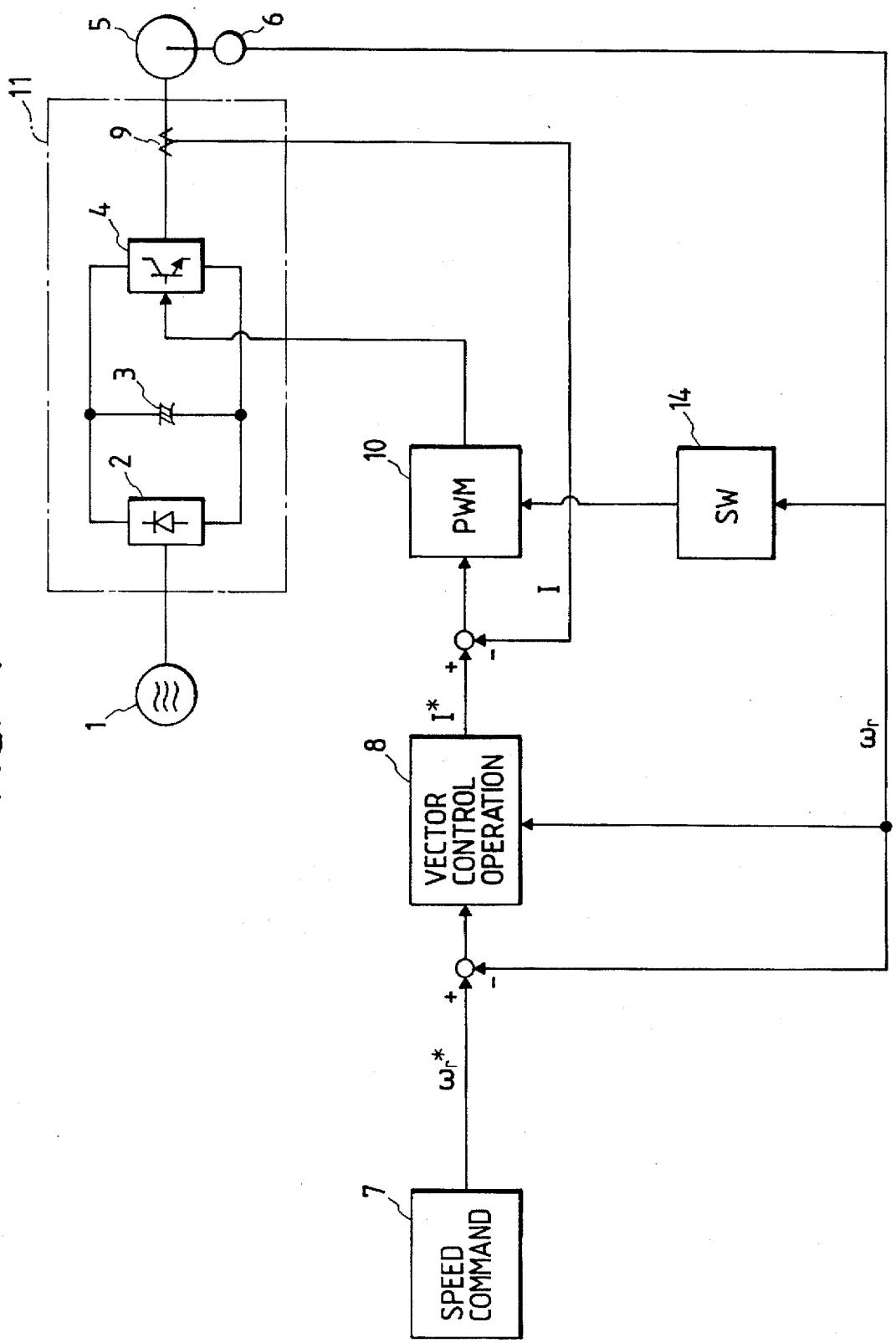
FIG. 1 is a major arrangement diagram of an embodiment of an inverter control apparatus for driving a motor according to the invention.

A first embodiment of the invention will be described with respect to FIG. 1 which is a major arrangement diagram of an inverter control apparatus which drives a motor.

In this drawing, the numeral 14 indicates a low speed-high speed PWM switching circuit having means which receives the detection output ωr of the speed detector 6, judges whether the current motor speed is in a low speed range or a high speed range, and switches the fpwm of the PWM circuit 10.

Figure 2:
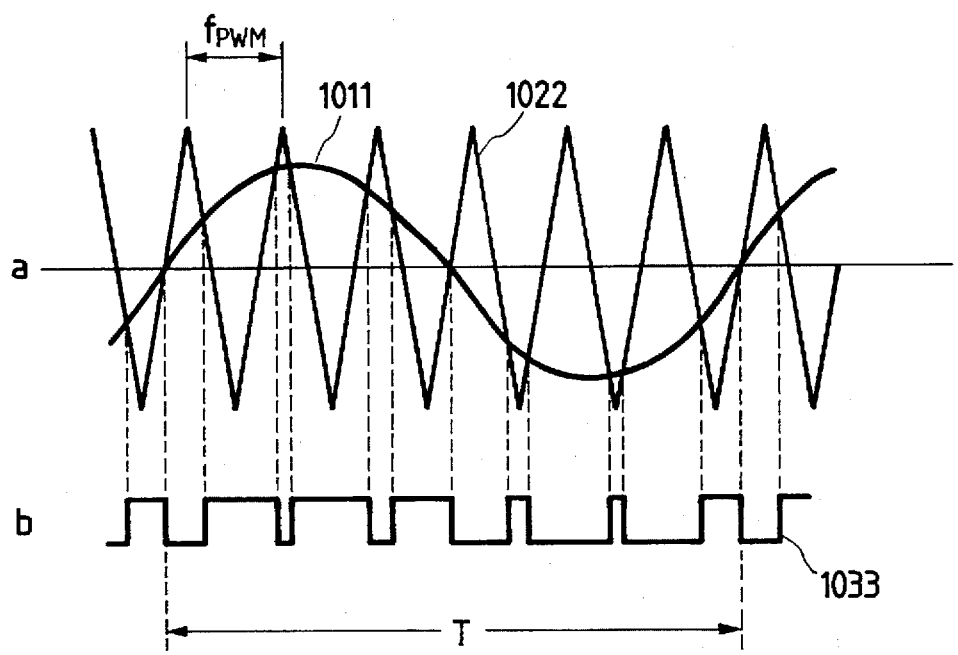
FIGS. 2(A)–2(B) are an operation timing chart of the embodiment of the inverter control apparatus for driving a motor according to the invention.

FIGS. 2(A)-2(B) are an operation timing chart of the inverter control apparatus for driving a motor as the first embodiment of the invention. The operation principle of this embodiment will now be described in accordance with FIGS. 2(A)-2(B).

Figures 27A, 27B:
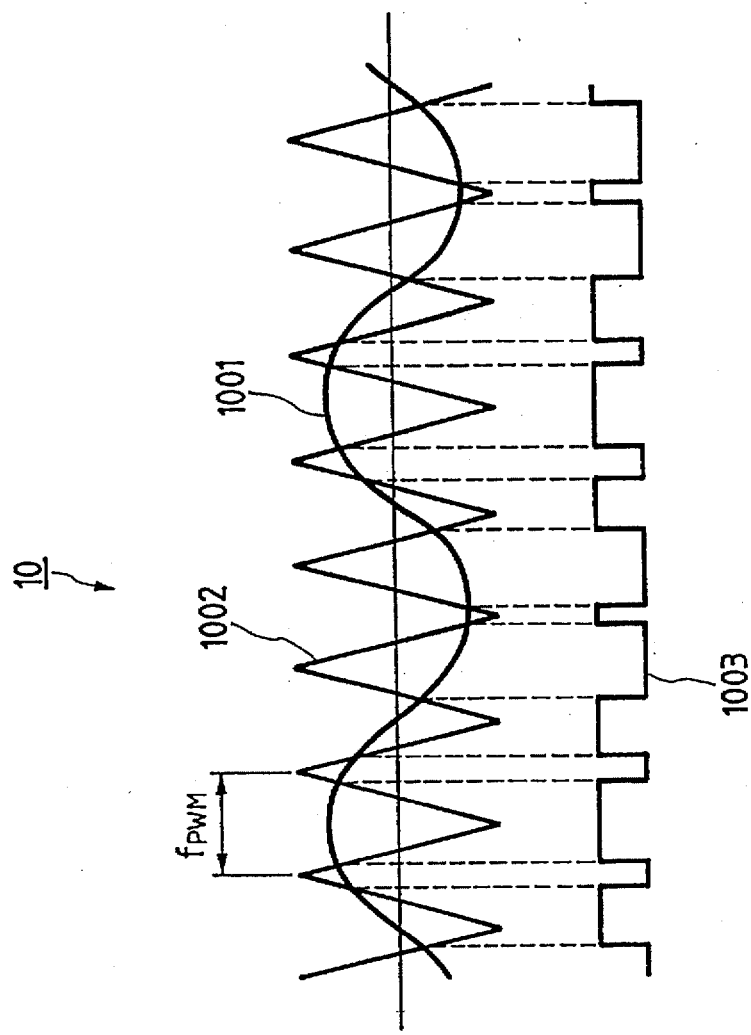
FIGS. 27(A)–27(B) are a PWM operation principle diagram of the conventional inverter control apparatus for driving a motor.

In FIGS. 2(A)-2(B) which show the internal arrangement of the PWM circuit 10 as in FIGS. 27(A)-27(B) are, a relationship between the fpwm and a motor current frequency fm will be described. Generally, to drive a motor without impairing the control performance, the following condition:

$$fpwm > 6 \times fm$$

is at least required. Namely, at least six switchings must be conducted in a single cycle of a motor current. FIGS. 2(A)-2(B) shows the occurrence of the six switchings. To give a specific example for ease of understanding, when a two-pole induction motor is rotated at 50000 rpm:

$$fm=(P \times \omega r/12)=(2 \times 50000/120)=0.833 \text{ KHz}$$

Hence, $$fpwm > 6 \times fm = 6 \times 0.833 \text{ KHz} = 5 \text{ KHz}$$

If the motor is rotated at 25000 rpm, the fpwm may be 2.5 KHz.

Figure 3:
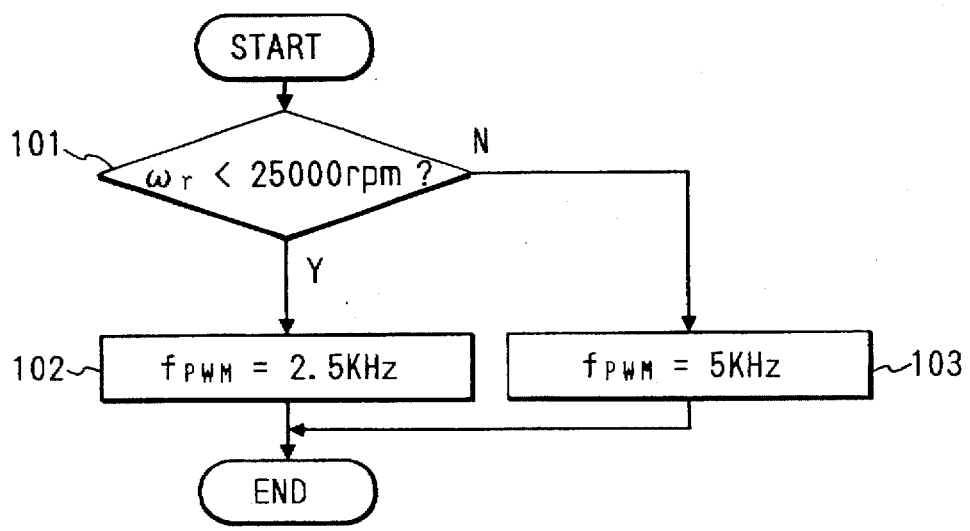
FIG. 3 is an operation flow chart of the embodiment of the inverter control apparatus for driving a motor according to the invention.

FIG. 3 is an operation flowchart of the inverter control apparatus for driving a motor in the first embodiment of the invention. The flowchart example of the operation performed by the low speed-high speed PWM switching circuit 14 will now be described with reference to FIG. 3. First, it is judged at step 101 whether or not the motor speed r is less than 25000 rpm. If the speed is less than 25000 rpm, the fpwm is set to 2.5 KHz at step 102. If not less than 25000 rpm, the fpwm is set to 5 KHz at step 103.

According to the conventional art, the fpwm was set to 5 KHz also in a low speed range to drive the motor at 50000 rpm, which incurred the increase of heat generated by the switching devices in the low speed range where heavy cutting is done relatively many times and the motor current increases. As explained, this resulted in the enlarged size and outline of the inverter control apparatus.

According to the present invention, the fpwm is the same as in the conventional art in the low speed range, where heavy cutting is performed relatively many times, to prevent the switching device-generated heat from increasing. However, the fpwm is raised in the high speed range where primarily light cutting is conducted, in order to maintain the control performance. As a result, the inverter control apparatus with the features of the conventional apparatus shown in FIG. 28(a) can be used to ensure very fast revolutions as described below.

Also, in the present invention, the speed at which the fpwm is switched is the speed detected by the speed detector installed directly to the motor. Accordingly, the actual speed of the motor can be grasped accurately in real time and a speed detection delay does not take place at the timing of switching to provide a smooth acceleration/deceleration characteristic.

In addition to the method of the present invention, the speed at which the fpwm is switched may be defined by a speed command or estimated from the frequency of the motor current. If the speed command is used, however, there will generally be a delay between the speed command and the actual speed, causing the switching to be done at a speed different from the actual speed desired to be used for the switching. Also, if the speed estimated from the frequency of the current is employed, a speed estimation value error will be produced due to the current waveform having PWM-derived harmonics, making it impossible to conduct switching at a precise speed. As compared to the first embodiment of the present invention, therefore, it is difficult to provide a smooth acceleration/deceleration characteristic in such method.

Figure 4:
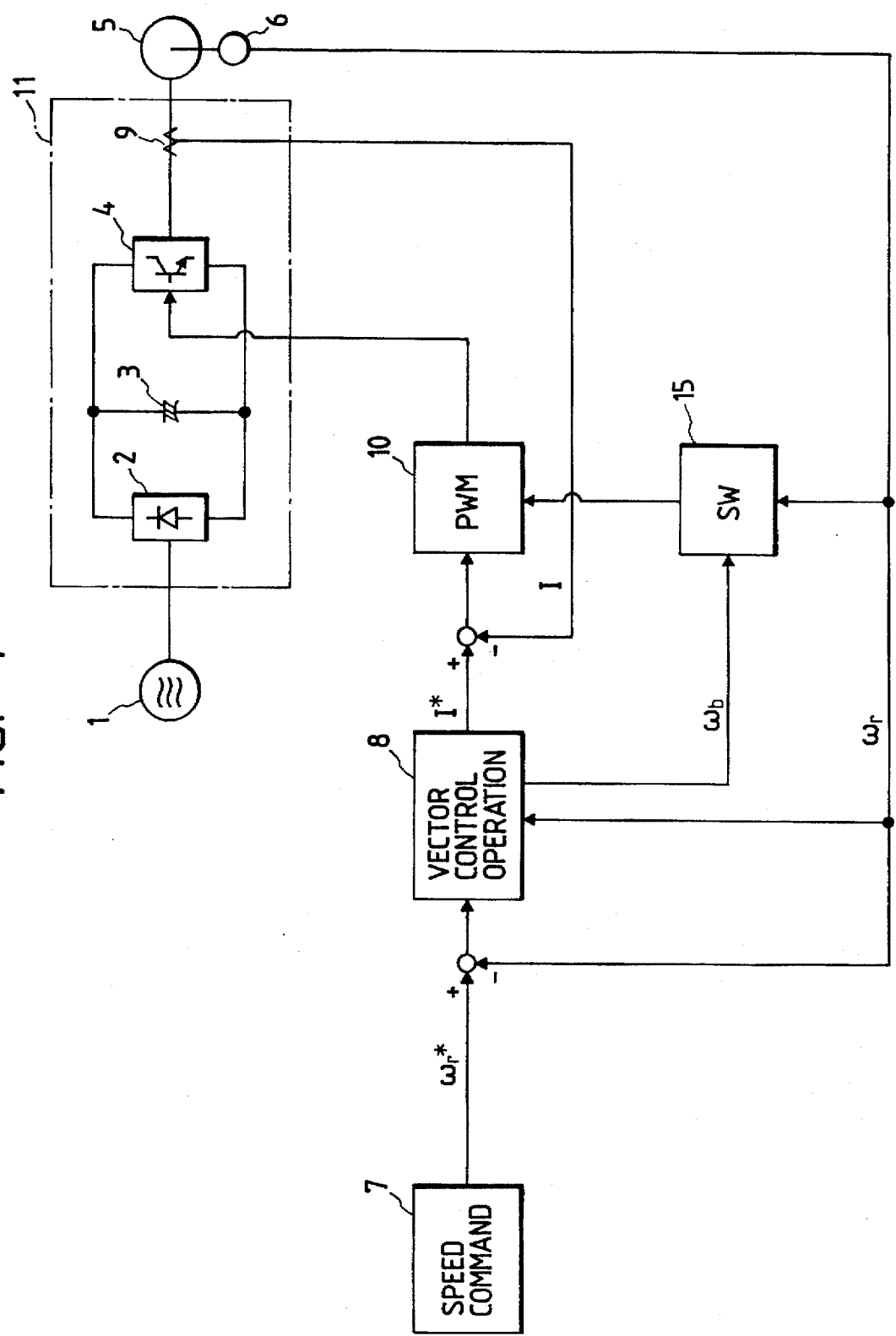
FIG. 4 is a major arrangement diagram of a second embodiment of an inverter control apparatus for driving a motor according to the invention.
Figure 5:
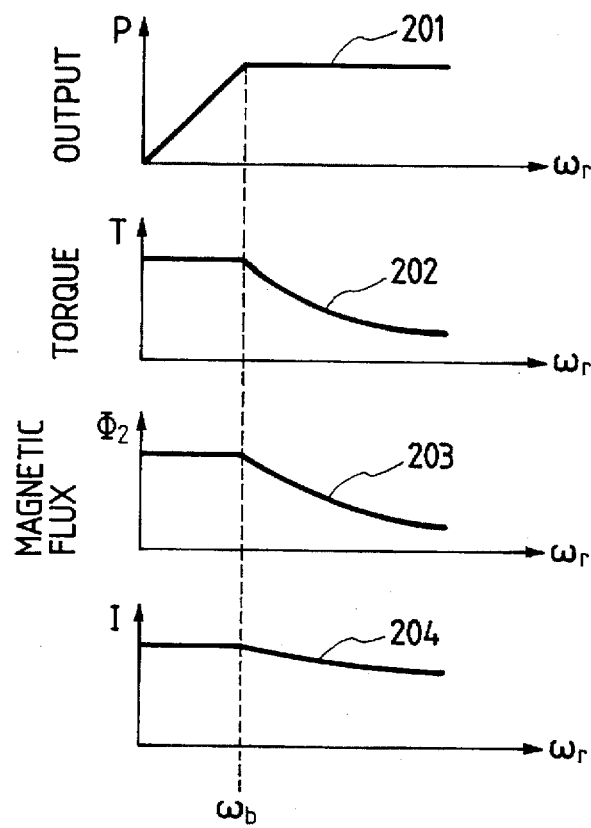
FIGS. 5(A)–5(D) are an operation timing chart of the second embodiment of the inverter control apparatus for driving a motor according to the invention.

A second embodiment of the invention will now be described with respect to FIG. 4, which is a major arrangement diagram of an inverter control apparatus for driving a motor. In this drawing, 15 indicates a constant torque-constant output PWM switching circuit which receives the detection output ωr of the speed detector 6 and the motor base speed ωb of the secondary magnetic flux pattern generator included in the vector control operation circuit 8, judges whether the current motor speed is in a constant torque region (i.e., less than ωb) or in a constant output region (i.e., not less than ωb), and switches the fpwm of the PWM circuit 10.

FIGS. 5(A)-5(D) an operation timing chart of the inverter control apparatus for driving a motor in accordance with the second embodiment of the invention. The operation principle of the present embodiment will now be described in accordance with FIG. 5.

FIGS. 5(A)-4(D) show motor characteristics, wherein 201 indicates an output-speed characteristic, 202 designates a torque-speed characteristic, 203 represents a secondary magnetic flux-speed characteristic, and 204 denotes a primary current-speed characteristic. The output characteristic of an induction motor is generally designed to increase the output in proportion to the speed in a speed region of less than ωb as indicated by 201, and to keep the output constant in a speed region of not less than ωb. This speed for switching ωb is generally called a base speed. 202 evidently indicates a constant torque characteristic (constant torque region) at less than ωb and a constant output characteristic (constant output region) at not less than ωb. Also, being proportional to the torque, the secondary magnetic flux is curved like the torque as indicated by 203. Also, the primary current of the motor, i.e., the current flowing in the switching devices of the inverter circuit 4, is constant at less than ωb as indicated by 204 and gradually decreases in excess of ωb.

Relationships between the fpwm, motor primary current and switching device-generated heat will now be described. Generally, switching device loss is classified into:

(1) switching loss which is proportional to the fpwm and motor primary current; and (2) steady loss which is proportional to the motor primary current.

Also, a motor is generally run with low noise in order to reduce an offensive motor excitation sound which is likely to occur especially at the speed of less than ωb where the secondary magnetic flux is large. Hence, the fpwm need not always be high in all speed regions to ensure low noise, and it is the object of the present invention to decrease the fpwm in the constant output region, where the secondary magnetic flux and motor primary current are small, to prevent the total switching device loss from increasing.

Figure 6:
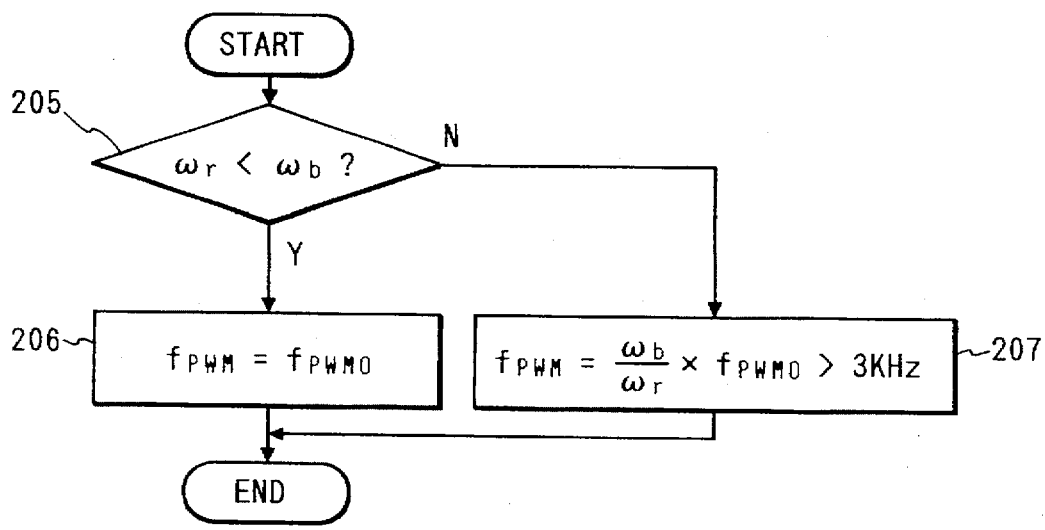
FIG. 6 is an operation flowchart of the second embodiment of the inverter control apparatus for driving a motor according to the invention.

FIG. 6 is an operation flowchart of the inverter control apparatus for driving a motor in accordance with a second embodiment of the invention. The flowchart of operation performed by the constant torque-constant output PWM switching circuit 15 will now be described with reference to FIG. 6. First, it is judged at step 205 whether or not the motor speed ωr is less than ωb. If the speed is less than ωb, the fpwm is set to fpwm0=10–20KHz at step 206. If the speed is not less than ωb, the fpwm is set at step 207 to (ωb/ωr)×fpwm0 under the condition of fpwm>3 KHz.

According to the conventional art, while the motor noise should primarily be reduced only in the speed region of less than ωb, the fpwm is set to 10–20 KHz also in the speed region of not less than ωb because there is no fpwm switching function, which incurred the increase of heat generated by the switching devices in all speed regions, resulting in the enlarged outline of the inverter control apparatus.

According to the present invention, the fpwm is raised in the constant torque region where the second magnetic flux is large, and the fpwm is gradually decreased in the constant output region, where the second magnetic flux reduces at higher speed, to prevent the total switching device-generated heat from increasing. As a result, the inverter control apparatus identical to the conventional design shown in FIG. 28(a) can be used to ensure low-noise operation of the motor as described below. Differences between the present embodiment and the first embodiment will now be described. The first embodiment switches the fpwm between the low speed range and high speed range (low fpwm in the low speed range and high fpwm in the high speed range), and the second embodiment switches the fpwm between the constant torque region and the constant output region (high fpwm in the constant torque region and low fpwm in the constant output region). Both embodiments are similar in that the fpwm is switched at a given speed but differ in that:

(1) The first embodiment uses as the switching speed the speed satisfying the condition of fpwm>6×fm, where fm=frequency of the motor primary current, to maintain the control performance even in the high speed range and to reduce heat generation in the low speed range; and (2) The second embodiment uses the motor base speed ωb as the switching speed to reduce motor noise at less than the base speed and to reduce heat generation at not less than the base speed. Hence, the first and second embodiments are opposite to each other in that the fpwm is decreased and increased at the switching speed, whereby they produce different effects, i.e., the first embodiment suppresses heat generation and simultaneously maintains the control performance in the very high speed range, while the second embodiment suppresses heat generation and simultaneously reduces noise in the low speed range.

Figure 7:
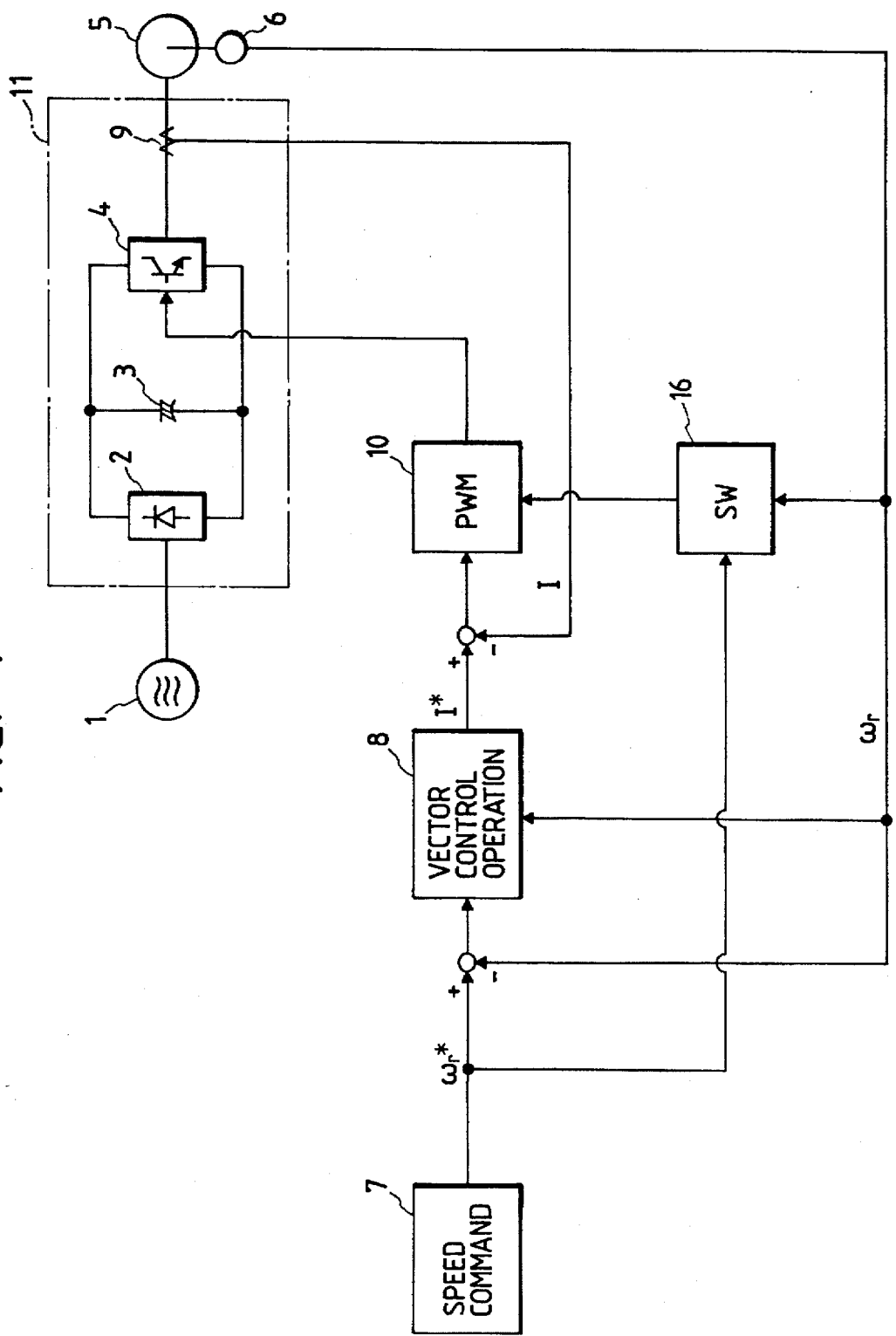
FIG. 7 is a major arrangement diagram of a third embodiment of an inverter control apparatus for driving a motor according to the invention.
Figure 8:
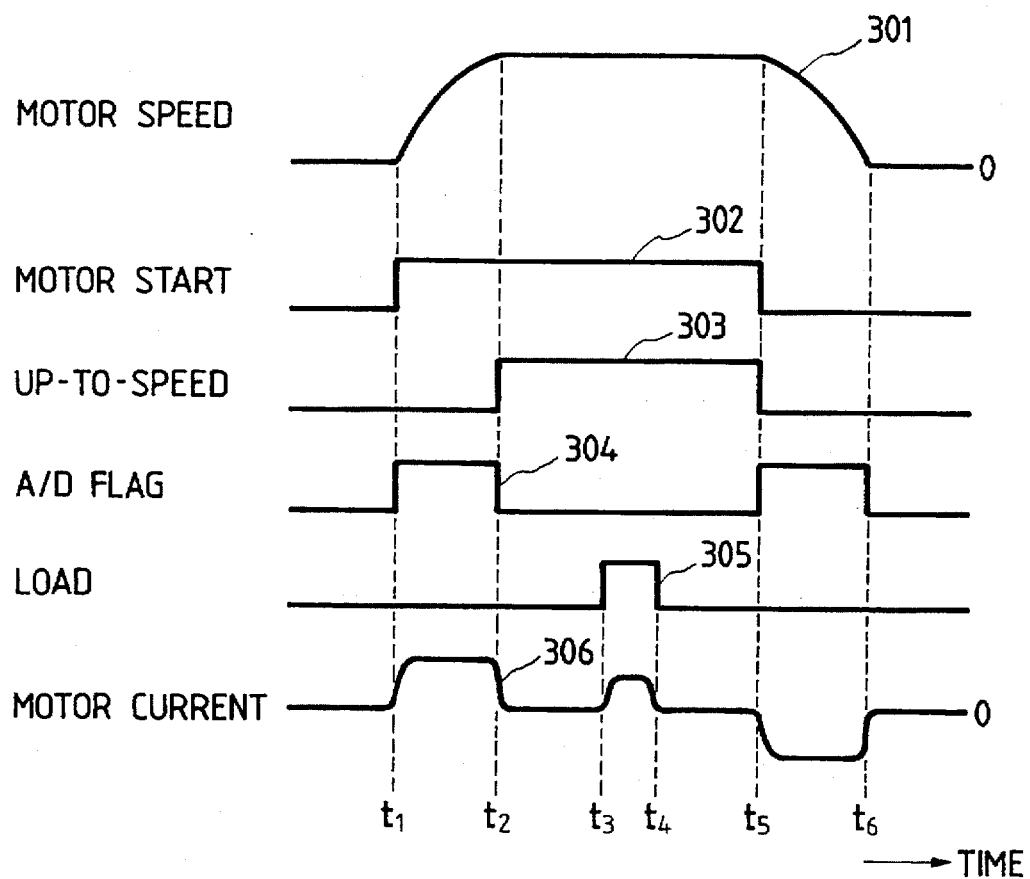
FIGS. 8(A)–8(F) are an operation timing chart of the third embodiment of the inverter control apparatus for driving a motor according to the invention.

A third embodiment of the invention will now be described with respect to FIG. 7 which is a major arrangement diagram of an inverter control apparatus for driving a motor. In this drawing, 16 indicates an acceleration/deceleration-steady state PWM switching circuit having means which receives the detection output ωr of the speed detector 6 and the command output ωr* of the speed command circuit 7, judges whether the current motor operation is in an acceleration/deceleration operation mode or in any other steady-state operation mode, and switches the fpwm of the PWM circuit 10.

FIGS. 8(A)–8(F) are an operation timing chart of the inverter control apparatus for driving a motor according to a third embodiment of the invention. The operation principle of this embodiment will now be described in accordance with FIGS. 8(A)–8(F).

FIGS. 8(A)–8(F) illustrates the way of judging the motor operation mode, wherein 301 indicates a motor speed, 302 designates a motor start signal, 303 represents an up-to-speed signal, 304 denotes an in-acceleration/deceleration flag, 305 indicates a cutting load state, and 306 represents a motor primary current. First, when the motor start signal 302 is switched on at time t1, the motor is accelerated and reaches a target speed at time t2, switching on the up-to-speed signal 303. When the load 305 is then applied to the motor by cutting at time t3, the motor primary current 306 corresponding to that load flows. When the load 305 is switched off at time t4 and the start signal 302 is subsequently switched off at time t5, the up-to-speed signal 303 switches off and the motor is decelerated. Between t1 and t2 and between t5 and t6, it is judged that the motor is being accelerated and decelerated in a method described later and the inacceleration/deceleration flag 304 switches on. Also during these acceleration and deceleration, it is ordinary that the maximum output of the motor is provided to minimize the time required for the acceleration and deceleration, and to achieve this, the motor primary current is also maximized.

To run the motor with low noise, emphasis is often laid on the reduction of noise during the acceleration/deceleration. This is because, when acceleration/deceleration is not being made and no-load operation without cutting is performed, soft excitation control which forcibly reduces the secondary magnetic flux of the motor, as described in the second embodiment of the invention, to lower the motor excitation sound is generally exercised and noise does not pose a problem. It is also because, when acceleration/deceleration is not being made and cutting is carried out, mechanical cutting sounds produced between a workpiece to be cut and a tool are much larger than electrical excitation sounds generated by the motor. Accordingly, it is often the case that the motor need not be reduced in noise.

Therefore, the fpwm need not always be increased in all operation modes for low noise, and it is the object of the present invention to increase the fpwm only during acceleration/deceleration operation where especially noise poses a problem and to reduce the fpwm during other steady-state operations, thereby preventing the total switching device loss from increasing.

Figure 9:
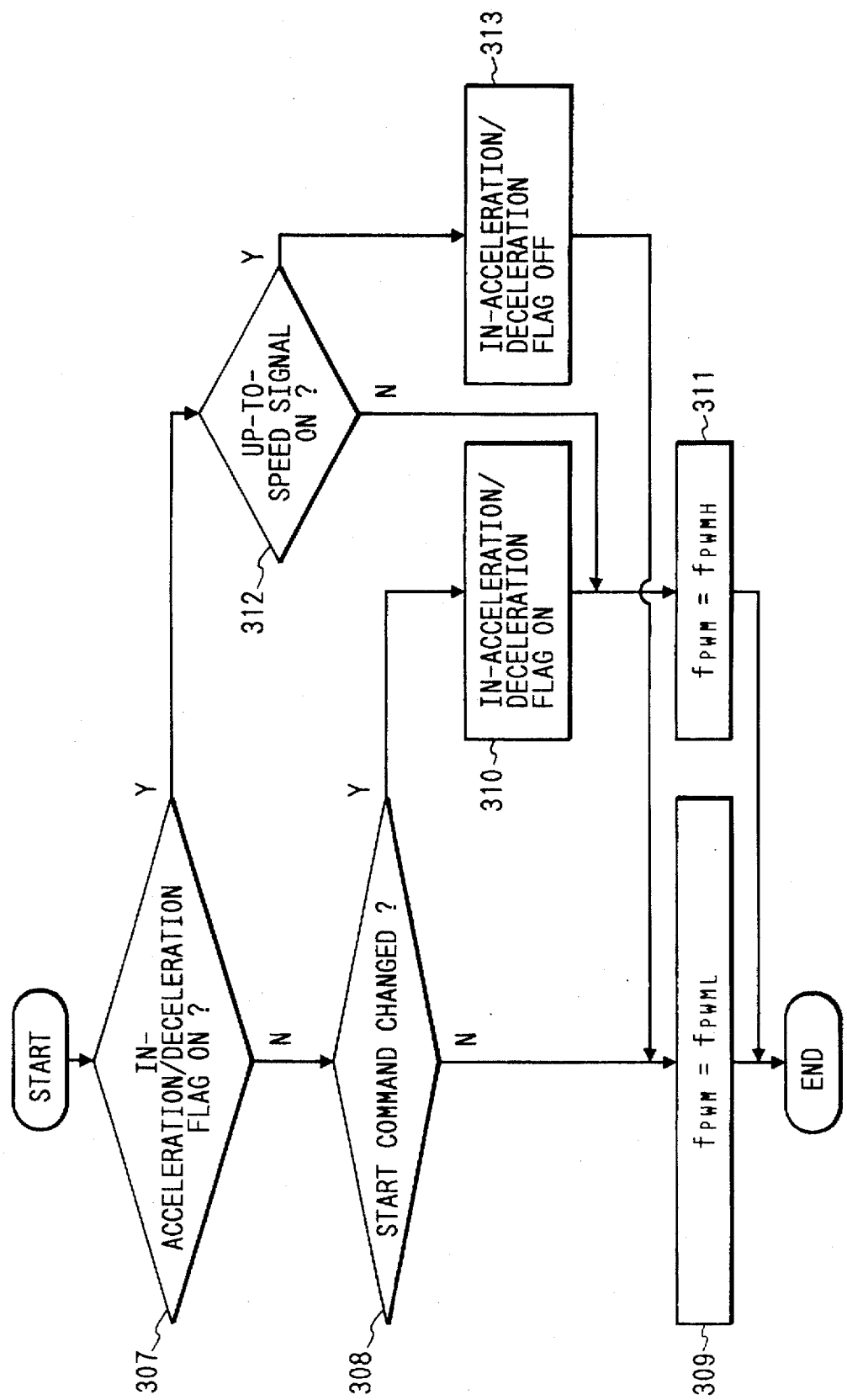
FIG. 9 is an operation flowchart of the third embodiment of the inverter control apparatus for driving a motor according to the invention.

FIG. 9 is an operation flowchart of the inverter control apparatus for driving a motor built in accordance with the third embodiment of the invention. The flowchart of operation performed by the acceleration/deceleration-steady state PWM switching circuit 16 will now be described in accordance with FIG. 9. First, it is judged at step 307 whether or not the in-acceleration/deceleration flag is on. If it is not on, the start command is checked at step 308. If the command has not changed, the fpwm is set to fpwmL=3–5 KHz at step 309. If the command checked has already changed at step 308, the in-acceleration/deceleration flag is switched on at step 310 and the fpwm is set to fpwmH=5–20 KHz at step 311. If the in-acceleration/deceleration flag is on at step 307, the up-to-speed signal is checked at step 312. If it is on, the execution proceeds to step 311. If it is not on, the in-acceleration/deceleration flag is switched off at step 313 and the operation then progresses to step 309.

According to the conventional art, while the motor noise should primarily be reduced only in the acceleration/deceleration operation mode, the fpwm is set to 10–20 KHz in all modes because there is no fpwm switching function. This incurred an increase of heat generated by the switching devices in all operation modes, resulting in the enlarged outline of the inverter control apparatus.

According to the present invention, the fpwm is raised in the acceleration/deceleration operation mode, where the motor current is large and motor excitation sounds are offensive, to reduce the motor noise, and the fpwm is lowered in the steady-state operation mode, where motor excitation sounds do not pose a problem, to prevent the total switching device-generated heat from increasing. As a result, the inverter control apparatus having the features of the conventional apparatus shown in FIG. 28(a) can be used to ensure low-noise operation of the motor as described below.

The present invention also has the feature that it exercises PWM control continually when not in the acceleration/ deceleration mode. As a result, a rapid response is ensured in the steady-state mode and the system is resistant to disturbance loads. These features are effective for the spindle of a machine tool, for example, to reduce noises in the acceleration/deceleration mode and simultaneously maintain a response to a cutting load in the steady-state mode.

Figure 10:
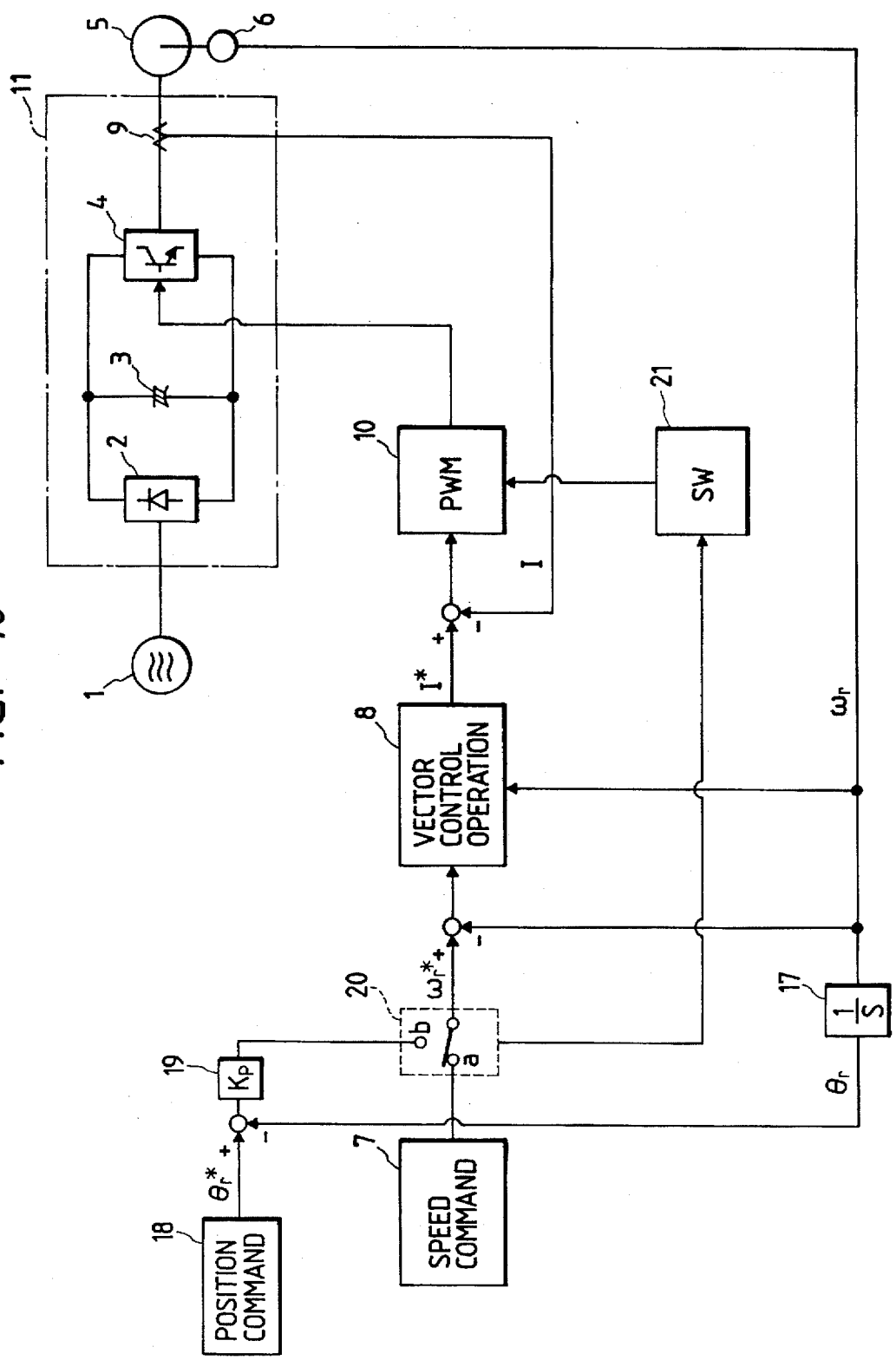
FIG. 10 is a major arrangement diagram of a fourth embodiment of an inverter control apparatus for driving a motor according to the invention.

A fourth embodiment of the invention will now be described. FIG. 10 is a major arrangement diagram of an inverter control apparatus for driving a motor. In this drawing, 17 indicates an integrator which integrates the detection output ωr of the speed detector 6 and outputs a position detection value θr, 18 denotes a position command circuit which provides the position reference θr* of the motor 5, 19 designates a position loop gain circuit which multiplies a deviation between the output θr* of the position command circuit 18 and the output θr of the integrator 17 by a position loop gain KP and outputs the result of multiplication as a speed command ωr*, 20 represents a speed-position mode select switch which switches a contact to position a if the current mode is a speed command operation mode and to position b if the current mode is a position command operation mode, and 21 indicates a speed-position PWM switching circuit having means which detects the position of the speed-position mode select switch 20 and switches the fpwm of the PWM circuit 10 between the speed command operation mode and position command operation mode.

Figure 11:
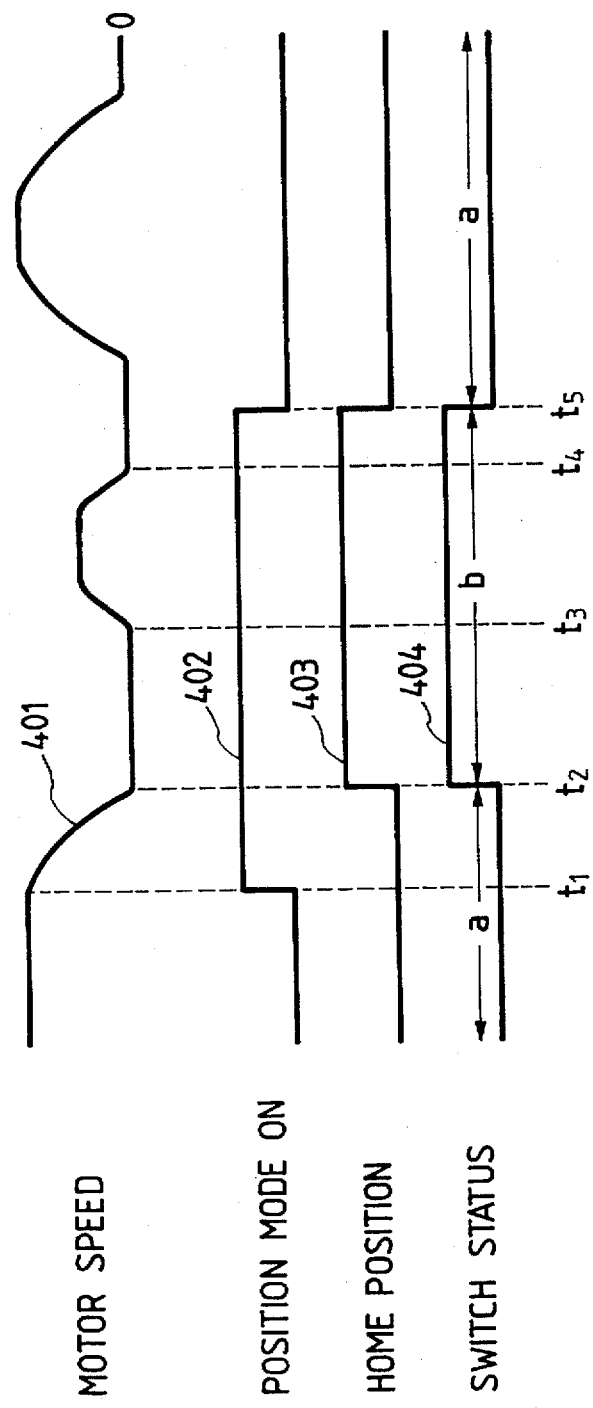
FIGS. 11(A)–11(D) are an operation timing chart of the fourth embodiment of the inverter control apparatus for driving a motor according to the invention.

FIGS. 11(A)–11(C) are an operation timing chart of the inverter control apparatus for driving a motor in accordance with the fourth embodiment of the invention. FIGS. 11(A)–11(D) illustrate the way of judging the command mode of the motor, wherein 401 indicates a motor speed, 402 represents a position mode ON signal, 403 designates a home position return completion signal, and 404 denotes a status signal of the speed-position mode select switch 20. First, when the position mode ON signal 402 is switched on at time t1, the motor starts decelerating to return to a home position and completes the home position return at time t2. At this time, the home position return completion signal 403 is switched ON, and at the same time, the speed-position mode select switch 20 moves from position a to position b. Subsequently, the motor is operated under a position command at time t3. When the position mode ON signal 402 is then switched OFF at time t5, the home position return completion signal 403 is switched off and simultaneously the speed-position mode select switch 20 is moved from position b to position a. Between t2 and t5, i.e., in the position command mode, high responsiveness is required for the speed loop of the motor as is typical in C axis control. In this position command mode, therefore, soft excitation control described in the third embodiment of the invention is not exercised (because soft excitation control reduces the speed loop gain equivalently, deteriorating speed response) but hard excitation control is often carried out, causing large noise (excitation sounds) to be generated from the motor as described above. Hence, the motor must be run with low noise in that position command mode, but the fpwm need not always be increased in all operation modes for this purpose. It is the object of the present invention to increase the fpwm only in the position command mode where noise particularly poses a problem and decrease the fpwm in the other mode, thereby maintaining the speed loop response in the position command mode and preventing the total switching device loss from increasing.

Figure 12:
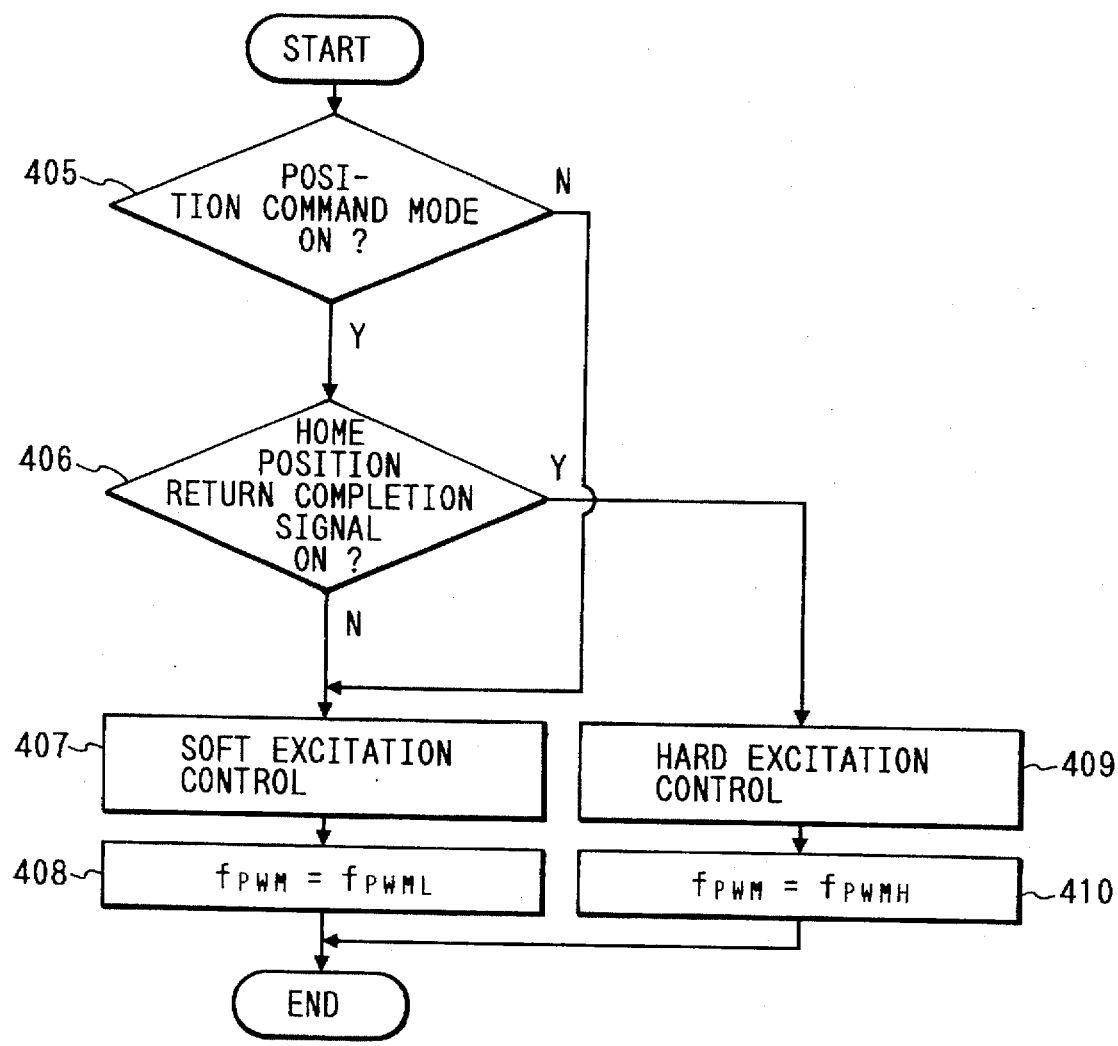
FIG. 12 is an operation flowchart of the fourth embodiment of the inverter control apparatus for driving a motor according to the invention.

FIG. 12 is an operation flowchart of the inverter control apparatus for driving a motor as the fourth embodiment of the invention. The flowchart of operation performed by the speed-position mode select switch 20 will now be described with reference to FIG. 12. First, it is judged at step 405 whether the position command mode is on. If it is not on, soft excitation control is exercised at step 407 and the fpwm is set to fpwmL=3–5 KHz at step 408. If the position command mode is on at step 405, it is judged at step 406 whether the home position return completion signal is on or not. If it is not on, the operation advances to steps 407 and 408. If the home position return completion signal is on at step 406, hard excitation control is carried out at step 409 and the fpwm is set to fpwmH=10–20 KHz at step 410.

According to the conventional art, while the motor noise should primarily be reduced only in the position command mode, the fpwm is set to 10–20 Hz in all modes because there is no fpwm switching function, which incurred the increase of heat generated by the switching devices in all operation modes, resulting in the enlarged outline of the inverter control apparatus.

According to the present invention, the fpwm is raised in the position command mode, where motor excitation sounds are offensive, to reduce the motor noise, and fpwm is lowered in the other speed command mode where motor excitation sounds do not pose a problem, to prevent the total switching device-generated heat from increasing. As a result, the inverter control apparatus identical to the conventional one shown in FIG. 28(a) can be used to ensure low-noise operation of the motor as described below.

Figure 13:
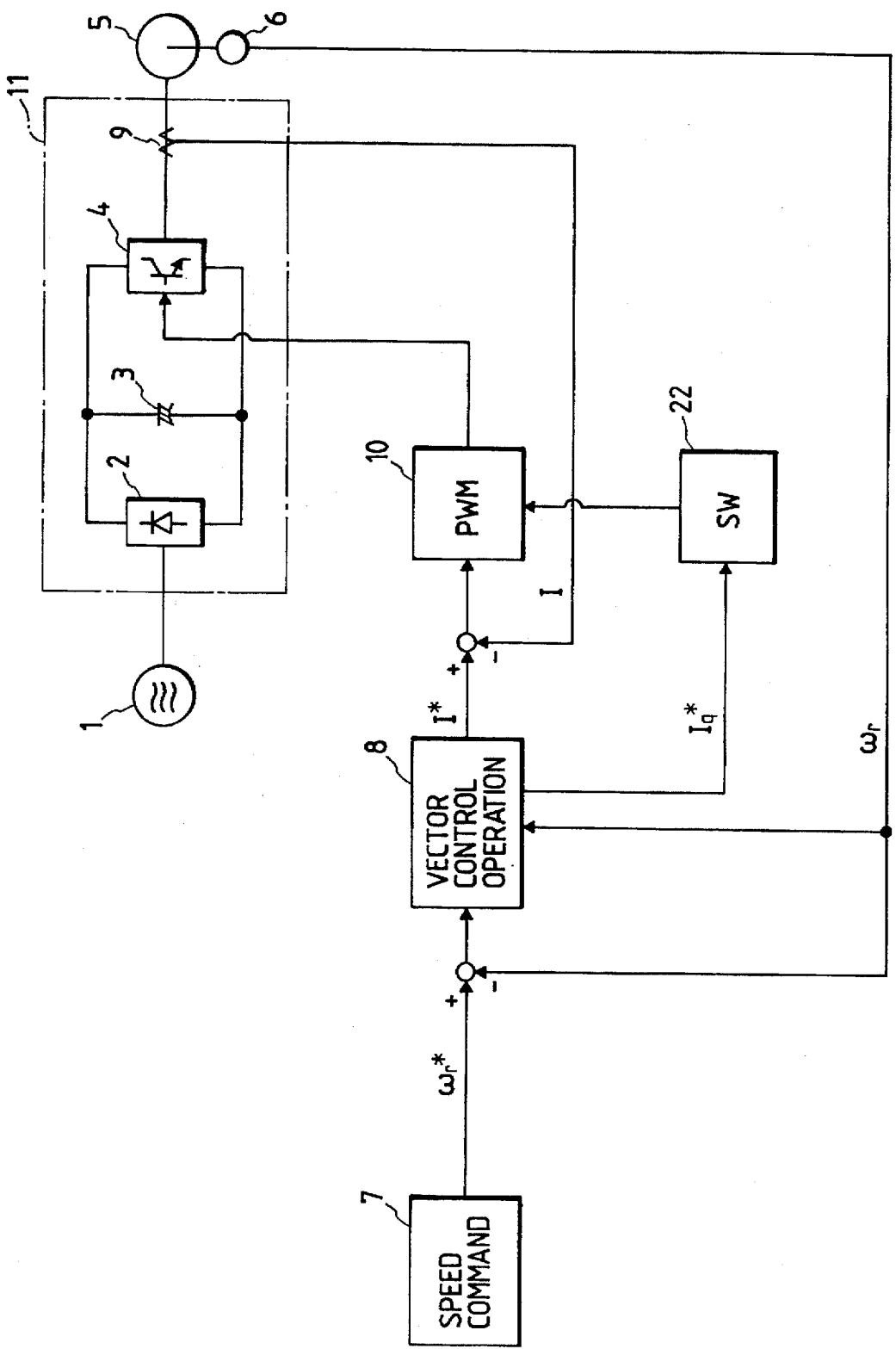
FIG. 13 is a major arrangement diagram of a fifth embodiment of an inverter control apparatus for driving a motor according to the invention.
Figure 14:
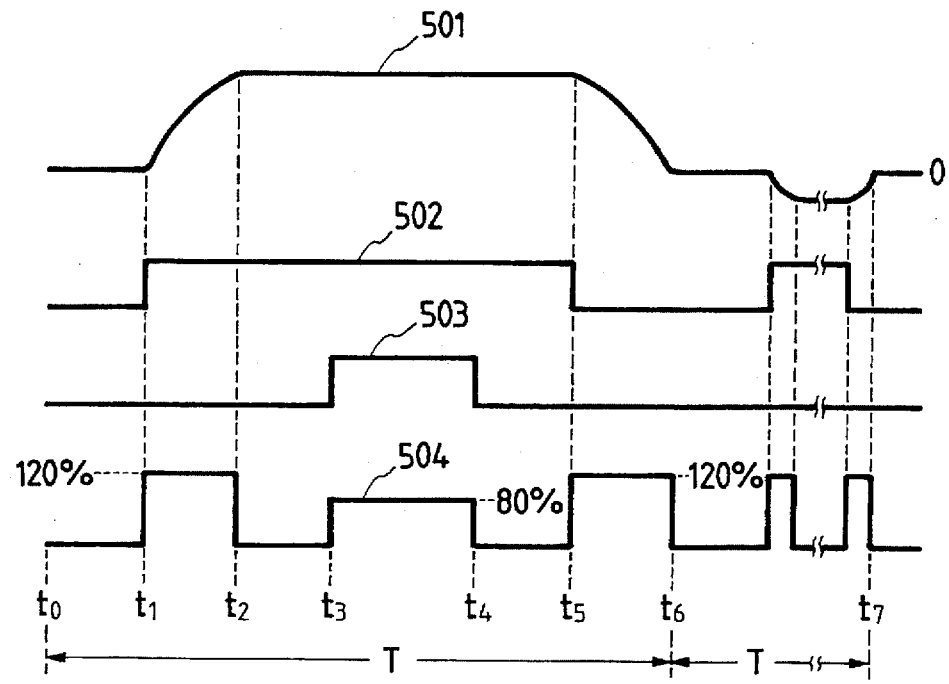
FIGS. 14(A)–14(D) are an operation timing chart of the fifth embodiment of the inverter control apparatus for driving a motor according to the invention.

A fifth embodiment of the invention will now be described using FIG. 13 which is a major arrangement diagram of an inverter control apparatus for driving a motor. In this drawing, 22 indicates an equivalent load factor PWM switching circuit having means which receives the current command value for torque Iq* from the vector control arithmetic circuit 8, operates on the equivalent load factor of the motor, and switches the fpwm of the PWM circuit 10.

FIGS. 14(A)–14(D) are an operation timing chart of the inverter control apparatus for driving a motor for the fifth embodiment of the invention. The operation principle of this embodiment will now be described in accordance with (FIGS. 14(A)–14(D)).

FIGS. 14(A)–14(D) illustrate the way of operating on the equivalent load factor of the motor, wherein 501 indicates a motor speed, 502 designates a motor start signal, 503 denotes a cutting load state, and 504 represents a current command value for torque Iq*. First, when the motor start signal 502 is switched on at time t1, the motor is accelerated and reaches a target speed at time t2. When the load 503 is then applied to the motor by cutting, etc., at time t3, the current command value for torque Iq* 504 corresponding to that load is output. When the load 503 is switched OFF at time t4 and the start signal 502 is subsequently switched off at time t5, the motor is decelerated. Between t1 and t2 and between t5 and t6, the motor is being accelerated and decelerated, the maximum output of the motor is provided to minimize the time required for the acceleration and deceleration, and to achieve this, the current command value for torque Iq* is generally 120% of the rated current value for torque.

Assuming that the cutting load between t3 and t4 is 80%, for example, and T is reference time for finding the equivalent load factor, the equivalent load factor between times t0 and t6 can be first found by:

Equivalent Load factor = mathematical expression 1

$$\sqrt{\frac{(1.2^2 \times \{(t_2 - t_1) + (t_6 - t_5)\} + 0.8^2 \times (t_4 - t_3)}{T}}$$

Similarly, the equivalent load factor in the next T period (between times t6 and t7) is found using a similar mathematical expression. Thereafter, the equivalent load factor is found for each T period in a similar manner. It is preferable to set this time T to about $1/5$ to $1/10$ of the time of a single cycle (i.e., time for repeating the same operations) because if T matches the single-cycle time, for example, the equivalent load factor will always be fixed, disallowing the effects of the present invention to be produced.

To run the motor with low noise, the point is to take this equivalent load factor into consideration because if the fpwm is increased excessively to run the motor with low noise as described above, switching device-generated heat increases, and in the worst case, the permissible temperature of the devices may be exceeded, causing the devices to be damaged or an overheat alarm to occur to protect the devices. To prevent this, it is required to monitor the equivalent load factor and simultaneously control the value of the fpwm to suppress device-generated heat.

Therefore, keeping the fpwm high for low noise may pose a problem in the protection of the devices, and it is the object of the present invention to make the fpwm variable according to the load factor, thereby preventing the total switching device loss from increasing.

Figure 15:
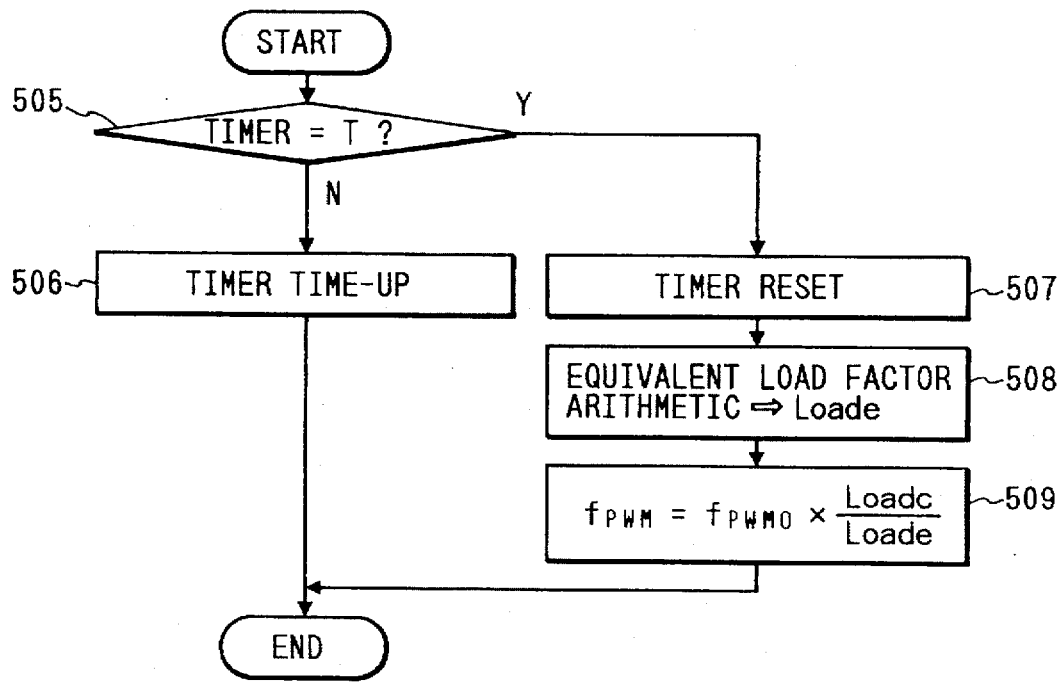
FIG. 15 is an operation flowchart of the fifth embodiment of the inverter control apparatus for driving a motor according to the invention.

FIG. 15 is an operation flowchart of the inverter control apparatus for driving a motor in accordance with the fifth embodiment of the invention. The flowchart of operation performed by the equivalent load factor PWM switching circuit 22 will now be described in accordance with FIG. 15. First, it is judged at step 505 whether a timer has timed up to T or not. If it has not timed up to T, the timer is caused to time up at step 506. If the timer has timed up to T, it is reset at step 507, the equivalent load factor is then operated on at step 508 using mathematical expression 1, and the result of that arithmetic process is defined as Load–e (%). Subsequently, the fpwm is set to fpwmO×(Load–c/Load–e) at step 509 (where fpwmO=10–20 KHz, Load–c=100%). Hence, according to this operation flowchart, as the equivalent load factor becomes larger, the fpwm is lowered.

Figure 28D:
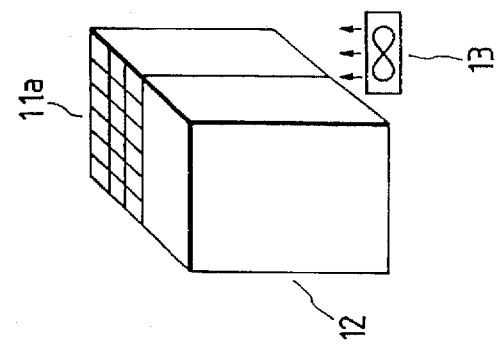
FIGS. 28(a)–28(d) are outline drawings of a conventional inverter control apparatus for driving a motor.
Figure 28C:
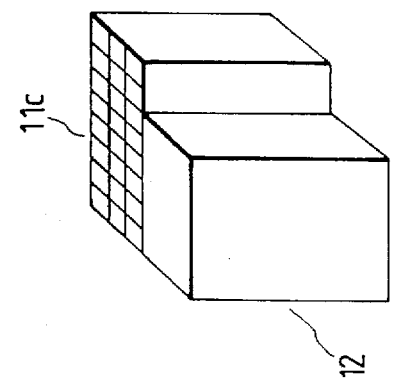
Figure 28B:
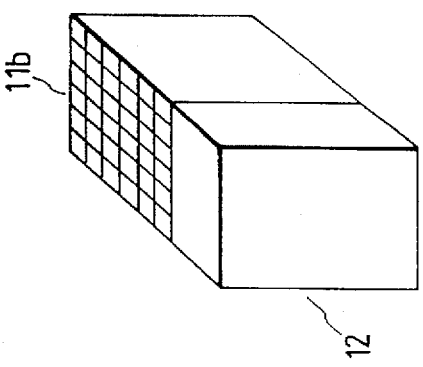
Figure 28A:
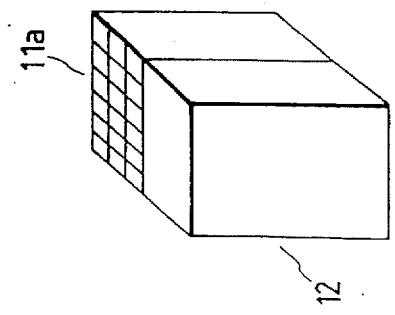

In accordance with the present invention, the fpwm is made variable according to the equivalent load factor to prevent total switching device-generated heat from increasing, whereby, as a result, the inverter control apparatus identical to the conventional one shown in FIG. 28(a) can be used to ensure low-noise operation of the motor as described below.

As a method similar to the one in the present invention, conceivable is a method that the instantaneous value of the motor current or the instantaneous value of the current command value for torque Iq* is regarded as a load factor and the fpwm made variable according to that load factor. In this method, however, since both the motor current and current command value for torque Iq* change abruptly (i.e., track load variations quickly), the fpwm changes also abruptly, making it difficult to exercise stable current control.

In contrast, the present invention maintains the given fpwm for a certain period of time, ensuring more stable current control.

Figure 16:
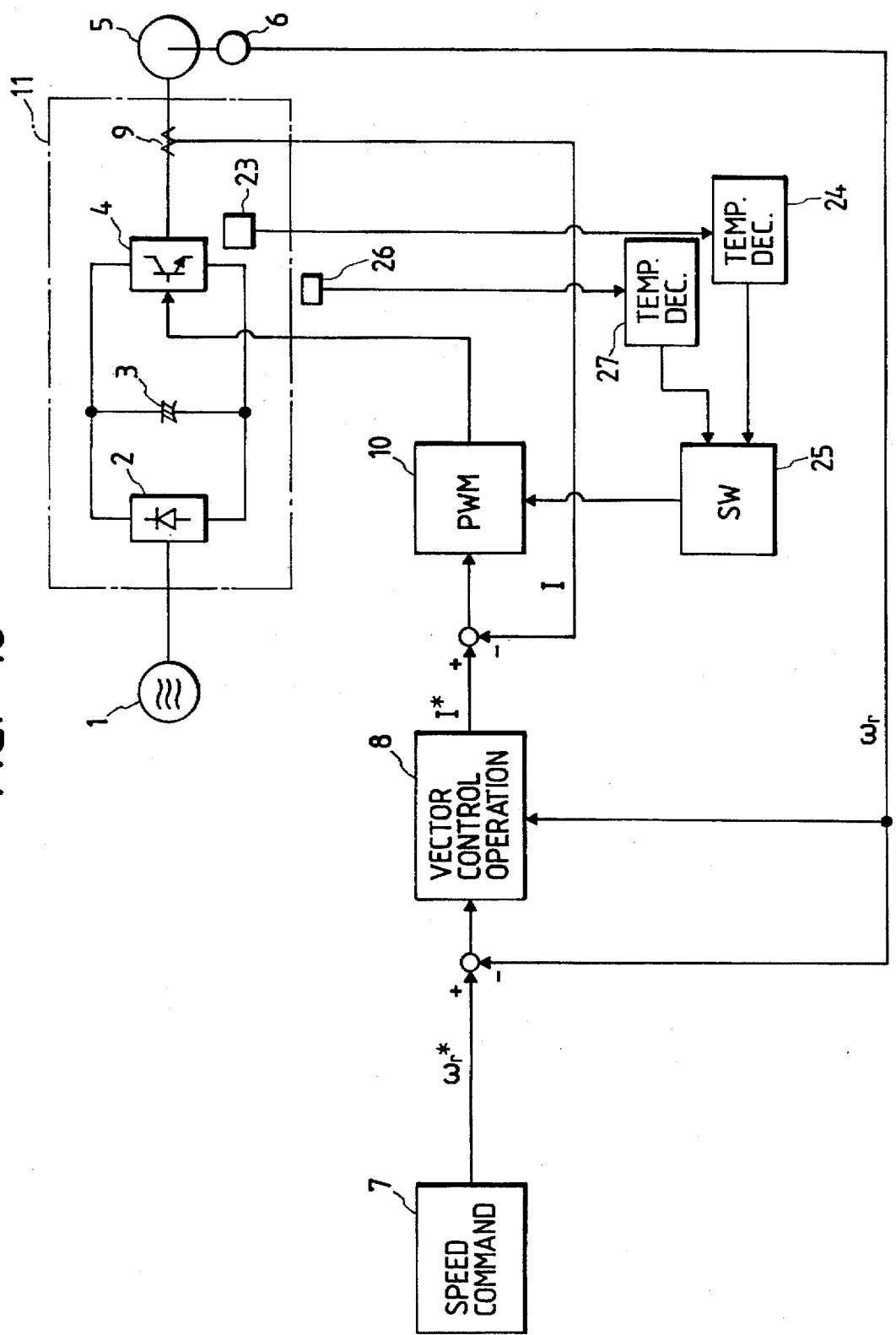
FIG. 16 is a major arrangement diagram of a sixth embodiment of an inverter control apparatus for driving a motor according to the invention.

A sixth embodiment of the invention will now be described using FIG. 16 which is a major arrangement diagram of an inverter control apparatus for driving a motor. In this drawing, 23 indicates a heat sink thermistor fitted to the heat sink 11 to measure the temperature of the switching devices in the inverter circuit 4, 24 denotes a heat sink temperature detection circuit which receives the output of the heat sink thermistor 23, 26 represents an ambient temperature thermistor which is fitted to the periphery of the inverter control apparatus installed within a control box to measure the ambient temperature of the control box, 27 designates an ambient temperature detection circuit which receives the output of the ambient temperature thermistor 26, and 25 indicates a heat sink-ambient temperature difference PWM switching circuit having means which receives ambient temperature data from the ambient temperature detection circuit 27 and switches the fpwm of the PWM circuit 10 according to a difference therebetween.

Figure 17:
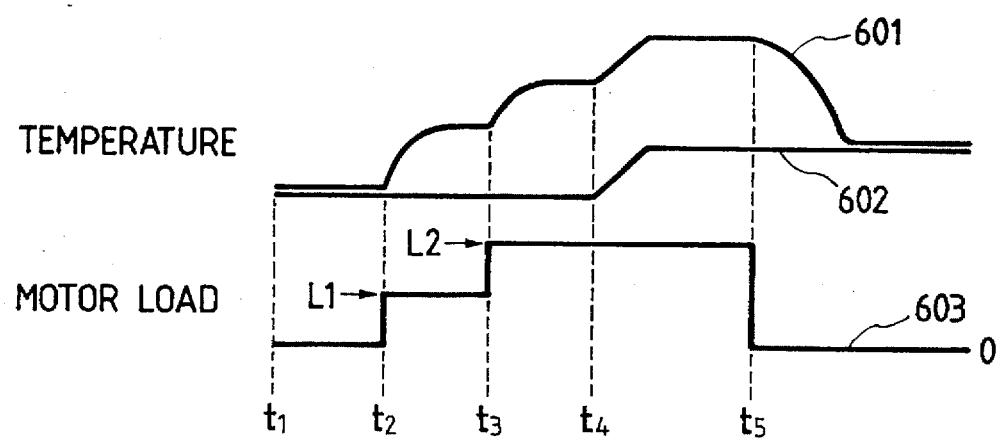
FIGS. 17(A)–17(C) are an operation timing chart of the sixth embodiment of the inverter control apparatus for driving a motor according to the invention.

FIGS. 17(A)–17(C) are an operation timing chart of the inverter control apparatus for driving a motor in accordance with the sixth embodiment of the invention. The operation of this embodiment will now be described with reference to FIGS. 17(A)–17(C), which shows the changes of heat sink temperature and ambient temperature. In the figure, 601 indicates the temperature of the heat sink, 602 designates ambient temperature, and 603 denotes a motor load state.

In this drawing, the motor load 603 is 0 between times t1 and t2 and the heat sink temperature 601 and ambient temperature 602 almost match. When the load of L1 is applied at time t2, the heat sink temperature 601 rises. When the load of L2 (>L1) is imposed at time t3, the heat sink temperature 601 rises further. When the ambient temperature 602 rises at time t4 with the load of L2 being applied, the heat sink temperature 601 also rises accordingly, but the temperature difference equals (heat sink temperature–ambient temperature) and is constant between times t4 and t5. When the motor load 603 is zeroed again at time t5, the heat sink temperature 601 falls and finally reaches almost the same value as the ambient temperature 602.

To run the motor with low noise, the point is to take this temperature difference into consideration because if the fpwm is increased excessively to run the motor with low noise as described above, switching device-generated heat increases, and in the worst case, the permissible temperature of the devices may be exceeded, causing the devices to be damaged or an overheat alarm to occur to protect the devices. To prevent this, only the heat sink temperature may be detected and the fpwm increased if the temperature is low and decreased if the temperature is high, but the load factor of the motor has not been considered because the heat sink temperature in this case includes the ambient temperature. Namely, since the value of the fpwm changes if only the ambient temperature changes, the noise level of the motor depends on the ambient temperature in spite of the same motor load factor. The present invention compensates for this disadvantage, i.e., obtains the temperature rise of only the devices according to the difference between the heat sink temperature and ambient temperature, thereby estimating the equivalent load factor of the motor and simultaneously controlling the value of the fpwm to suppress device-generated heat. Therefore, since keeping the fpwm high for low noise may pose a problem in the temperature protection of the devices, it is the object of the present invention to make the fpwm variable according to the load factor in order to prevent the total switching device loss from increasing.

Figure 18:
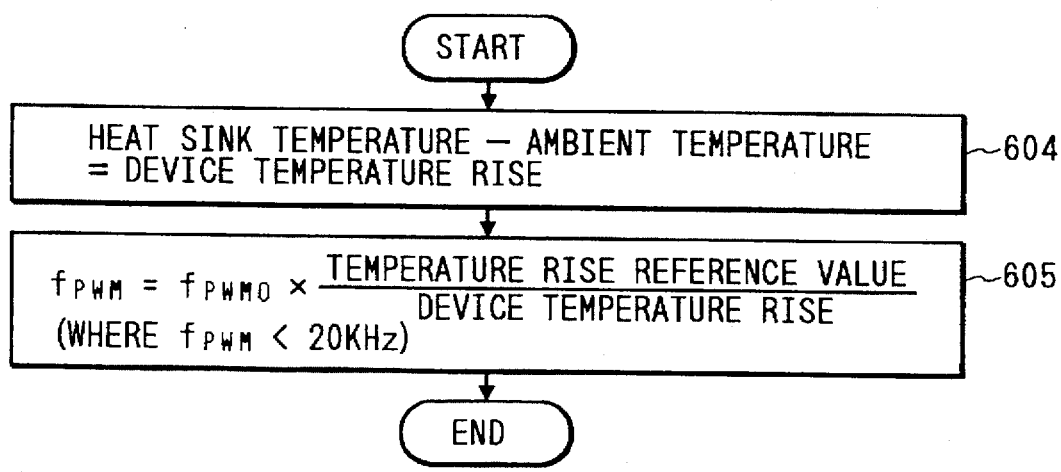
FIG. 18 is an operation flowchart of the sixth embodiment of the inverter control apparatus for driving a motor according to the invention.

FIG. 18 is an operation flowchart of the inverter control apparatus for driving a motor in accordance with the sixth embodiment of the invention. The flowchart of operation performed by the heat sink-ambient temperature difference PWM switching circuit 25 will now be described in accordance with FIG. 18. First, a device temperature rise is calculated from (heat sink temperature–ambient temperature) at step 604. Then, at step 605, the fpwm is set to fpwmO×(temperature rise reference value/device temperature rise) on the basis of the calculation result (where fpwmO=10–20 KHz, fpwm<20 KHz, temperature rise reference value=25 deg, for example).

According to the present invention, the fpwm is made variable in accordance with the difference between the heat sink temperature and ambient temperature (comparable to the switching device temperature rise and the change in motor equivalent load factor) to prevent total switching device-generated heat from increasing. As a result, the inverter control apparatus identical to the conventional one shown in FIG. 28(a) can be used to ensure low-noise operation of the motor as described below.

Figure 19:
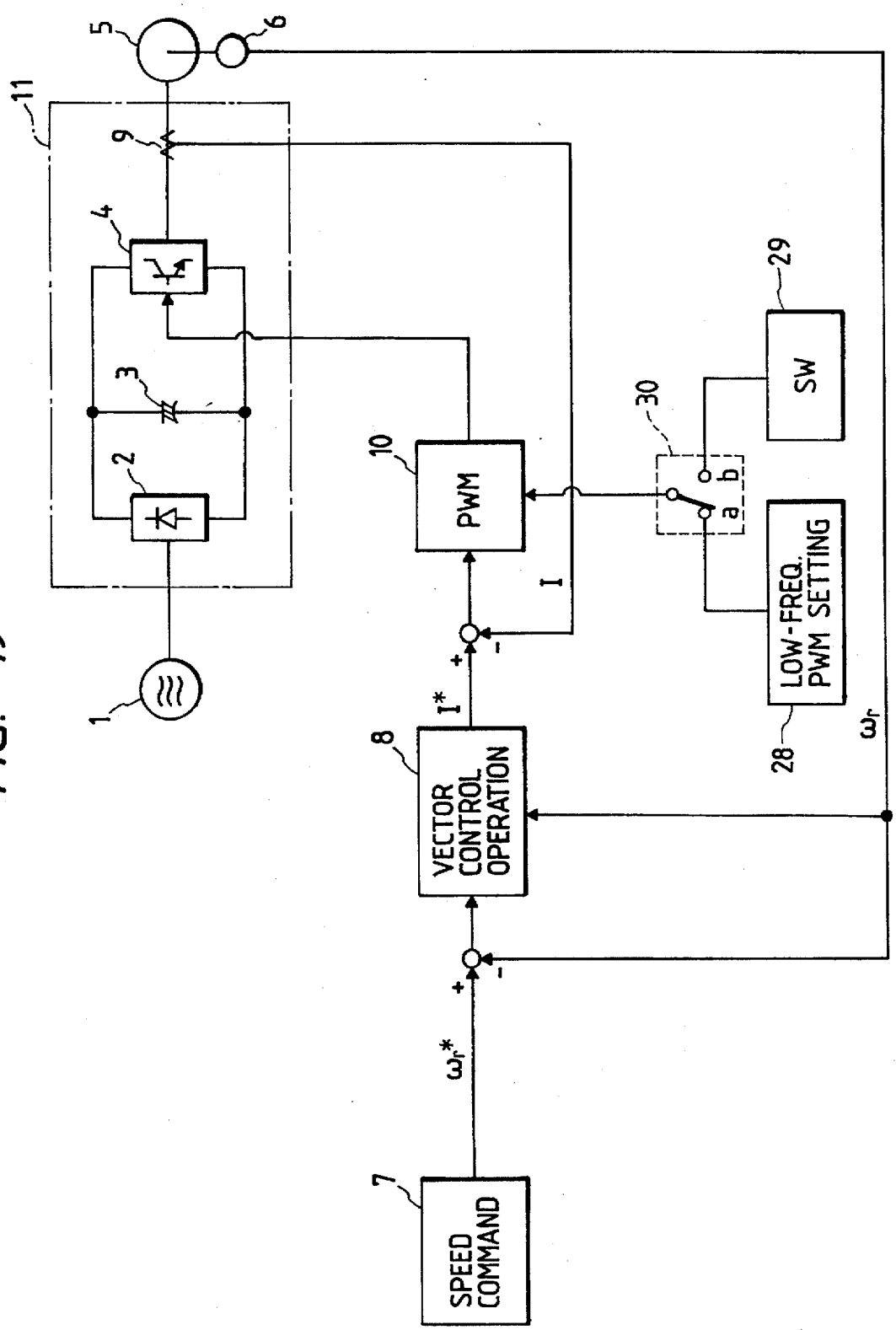
FIG. 19 is a major arrangement diagram of a seventh embodiment of an inverter control apparatus for driving a motor according to the invention.

A seventh embodiment of the invention will now be described using FIG. 19 which is a major arrangement diagram of an inverter control apparatus for driving a motor. In this drawing, 28 indicates a low-frequency PWM setting circuit in which the fpwm is fixed at a low frequency=3–5 KHz, 29 denotes a PWM switching circuit shown in each of the previous second through sixth embodiments, and 30 represents a PWM system select switch which selects either of the low-frequency PWM circuit 28 and PWM switching circuit 29.

Figure 20:
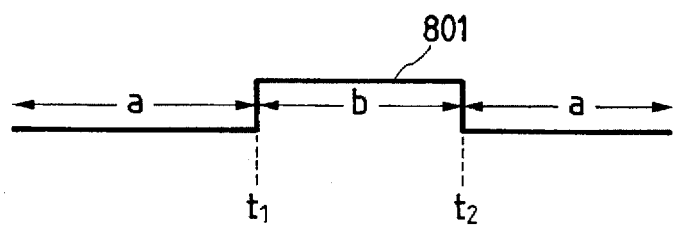
FIG. 20 is an operation timing chart of the seventh embodiment of the inverter control apparatus for driving a motor according to the invention.

FIG. 20 is an operation timing chart of the inverter control apparatus for driving a motor as the seventh embodiment of the invention. The operation principle of this embodiment will now be described in accordance with FIG. 20. In this drawing, 801 indicates the setting of the PWM system select switch 30. Before time t1, the PWM system select switch 30 is set in position a to perform regular operation which does not require low motor noise as in the conventional art. Subsequently, when low motor noise operation is required, the PWM system select switch 30 is moved to position b at time t1 to perform low-noise operation described in Embodiments 2 to 6 of the invention. To move this switch 30, a setting pin may be used to select either position, the parameter set value of a parameter setting device (not shown) used to select either position, or the switching command signal of an external command device (not shown) used to select either position. FIG. 20 shows that the switching command signal of the external command device is used to select either position dynamically.

Accordingly, it is the object of the present invention to avoid high-frequency PWM, in which the operating conditions are restricted to reduce switching device-generated heat, to allow operation to be performed at a load factor as high as possible when low noise is not required particularly, and to provide the fpwm variable function as described in previous embodiments to allow the same inverter control apparatus to be used when low noise is required, although the increase in switching device-generated heat will cause the load factor to be lower than in the case where the switch 30 is set to position a.

Figure 21:
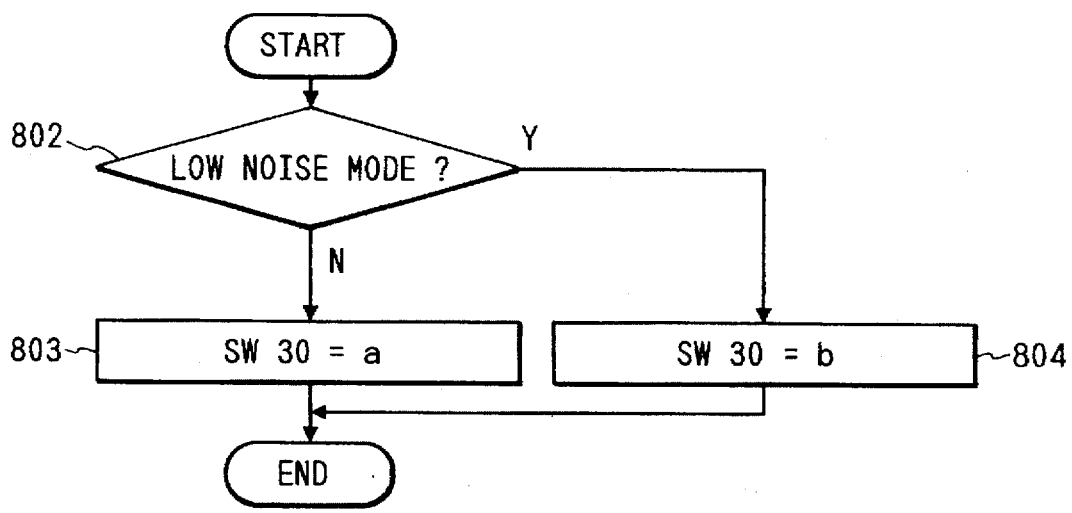
FIG. 21 is an operation flowchart of the seventh embodiment of the inverter control apparatus for driving a motor according to the invention.

FIG. 21 is an operation flowchart of the inverter control apparatus for driving a motor as the seventh embodiment of the invention. The flowchart of operation performed by the present invention will now be described with reference to FIG. 21. First, it is judged at step 802 whether the current operation is in a low noise mode or not. If it is not in the low noise mode, the switch 30 is set to position a at step 803 to set the fpwm to 3–5 KHz. If the current operation is in the low noise mode at step 802, the switch 30 is set to position b at step 804 to perform low-noise operation described in the second to sixth embodiments of the invention.

According to the present invention, operation can be performed at the maximum load factor when low noise is required and low-noise operation described in the second to sixth embodiments is performed when low noise is required. Accordingly, the first advantage is that only setting the switch allows the same inverter control apparatus to be used as both the low noise and high load factor types and the second advantage is that operation can be switched between the low noise mode and high load factor mode as desired.

Figure 22:
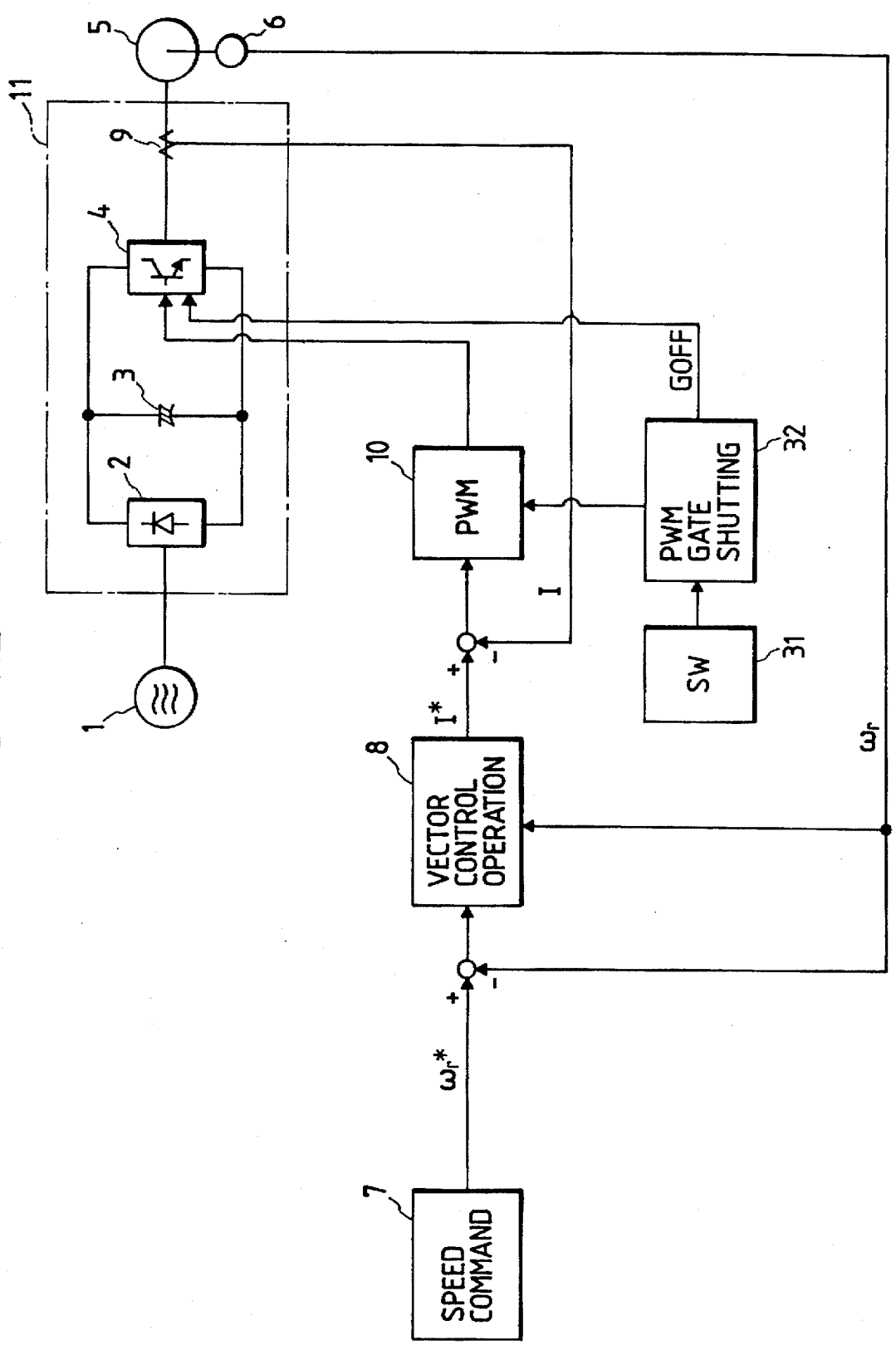
FIG. 22 is a major arrangement diagram of an eighth embodiment of an inverter control apparatus for driving a motor according to the invention.

An eighth embodiment of the invention will now be described. FIG. 22 is a major arrangement diagram of an inverter control apparatus for driving a motor in the eighth embodiment of the invention.

In this drawing, 31 indicates the PWM switching circuit shown in each of the previous first to sixth embodiments, and 32 designates a PWM gate shutting circuit which outputs a gate OFF signal (GOFF) to stop the switching of the switching devices in the inverter circuit 4 once when the fpwm is switched under the control of a switching signal received from the PWM switching circuit 31.

Figure 23:
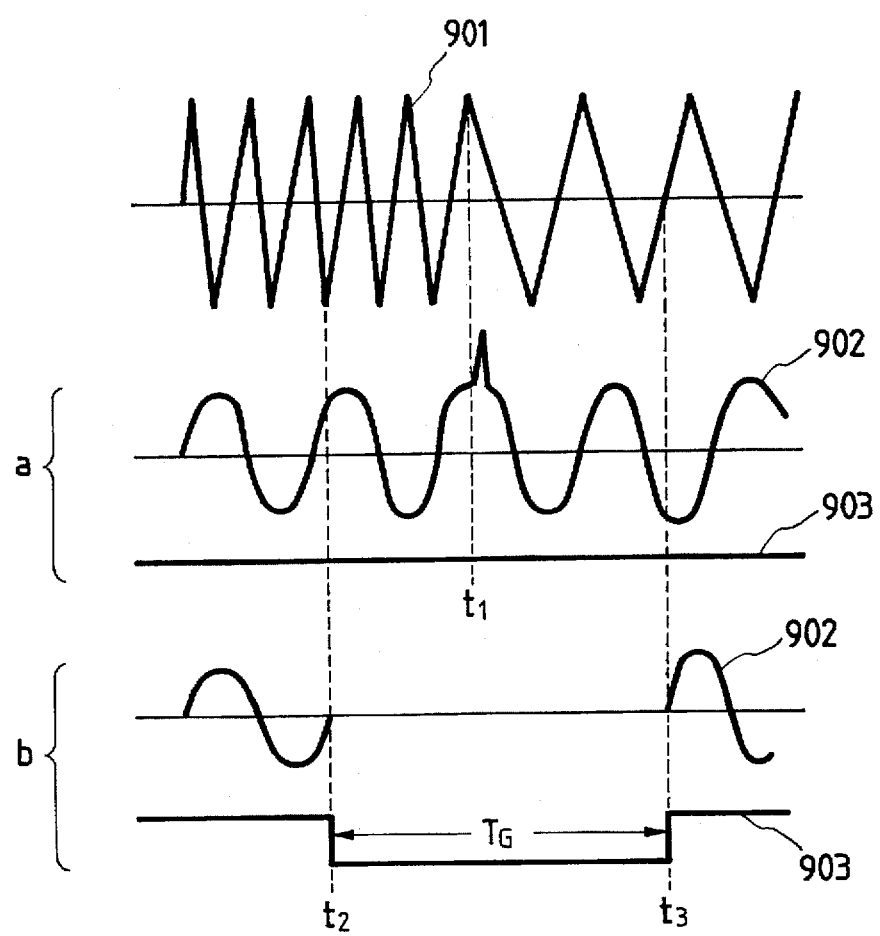
FIGS. 23(A)–23(C) are an operation timing chart of the eighth embodiment of the inverter control apparatus for driving a motor according to the invention.

FIGS. 23(A)–23(C) are an operation timing chart of the inverter control apparatus for driving a motor in accordance with the eighth embodiment of the invention. The operation principle of this embodiment will now be described with reference to FIGS. 23(A)–23(C).

In this drawing, 901 indicates a triangular wave for PWM control, 902 represents a motor current, and 903 designates a switching device gate ON signal. FIG. 23(A) shows the switching of the fpwm in the very fast operation or low-noise operation shown in embodiments 1 to 7 of the present invention, wherein the fpwm is instantaneously switched from low frequency to high frequency or from high frequency to low frequency at time t1. In this case, a problem is the jump of the current shown in the figure, which is caused by the sudden change of the fpwm as the disturbance of the control system near time t1. In FIG. 23(B) showing the present invention, gate shut-off is conducted at time t2 earlier than time t1, the fpwm is switched in this state at time t1, and the gate ON signal is switched on again at time t3 later than time t1. Thus, it is the object of the present invention to ensure stable fpwm switching without any jump of the motor current 902 which posed a problem in FIG. 23(A).

Figure 24:
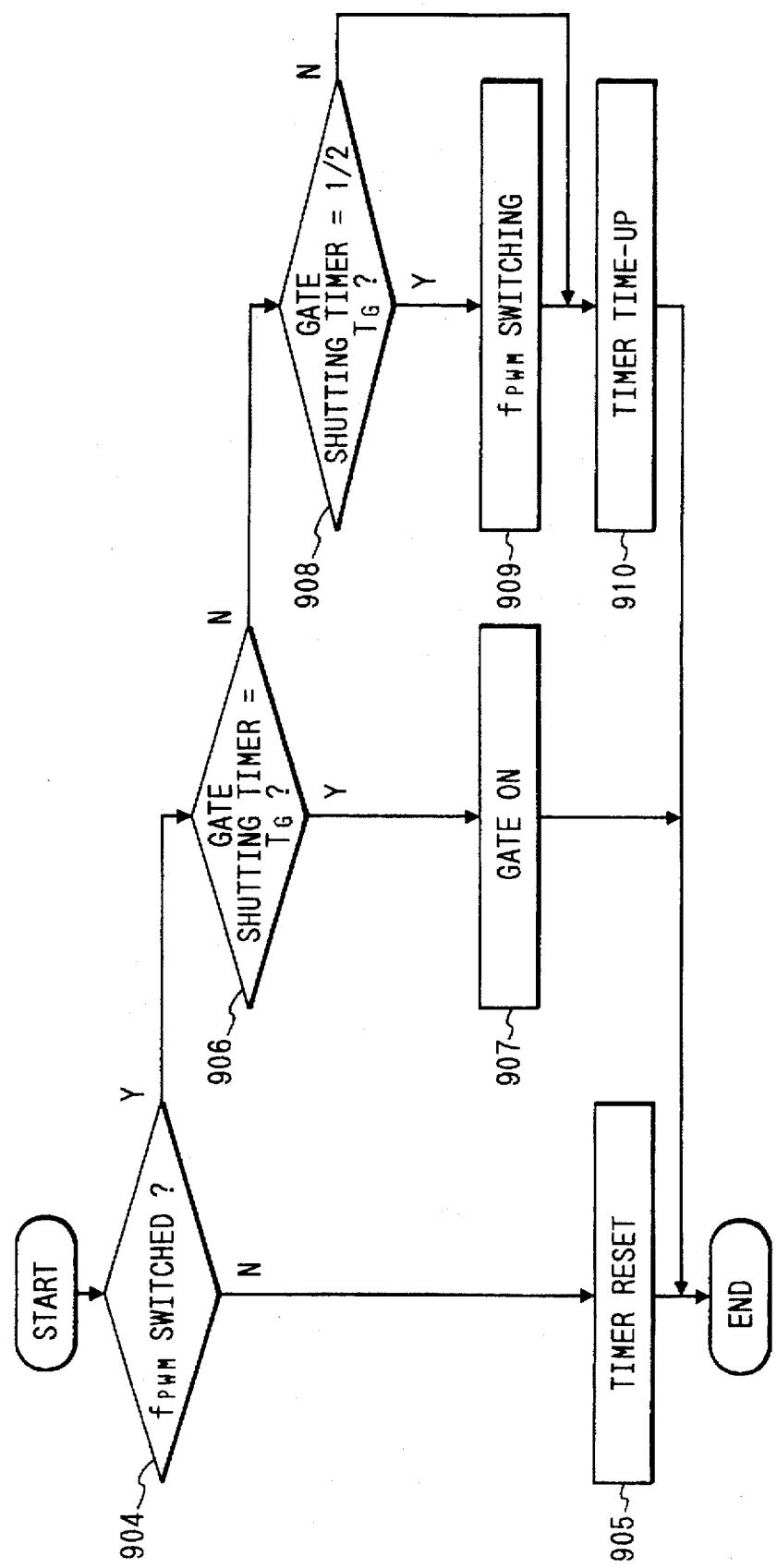
FIG. 24 is an operation flowchart of the eighth embodiment of the inverter control apparatus for driving a motor according to the invention.
Figure 25:
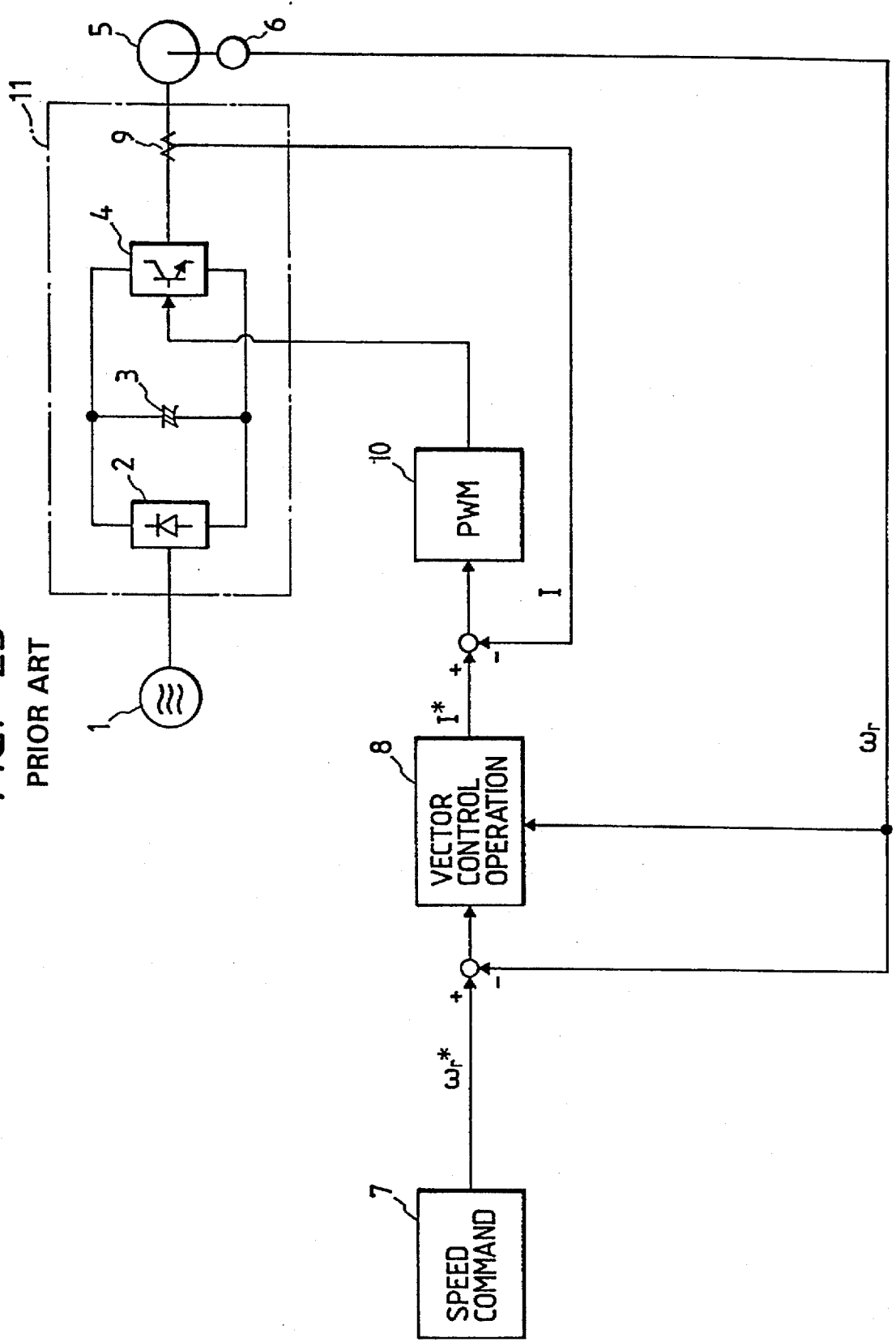
FIG. 25 is a major arrangement diagram of a conventional inverter control apparatus for driving a motor.
Figure 26:
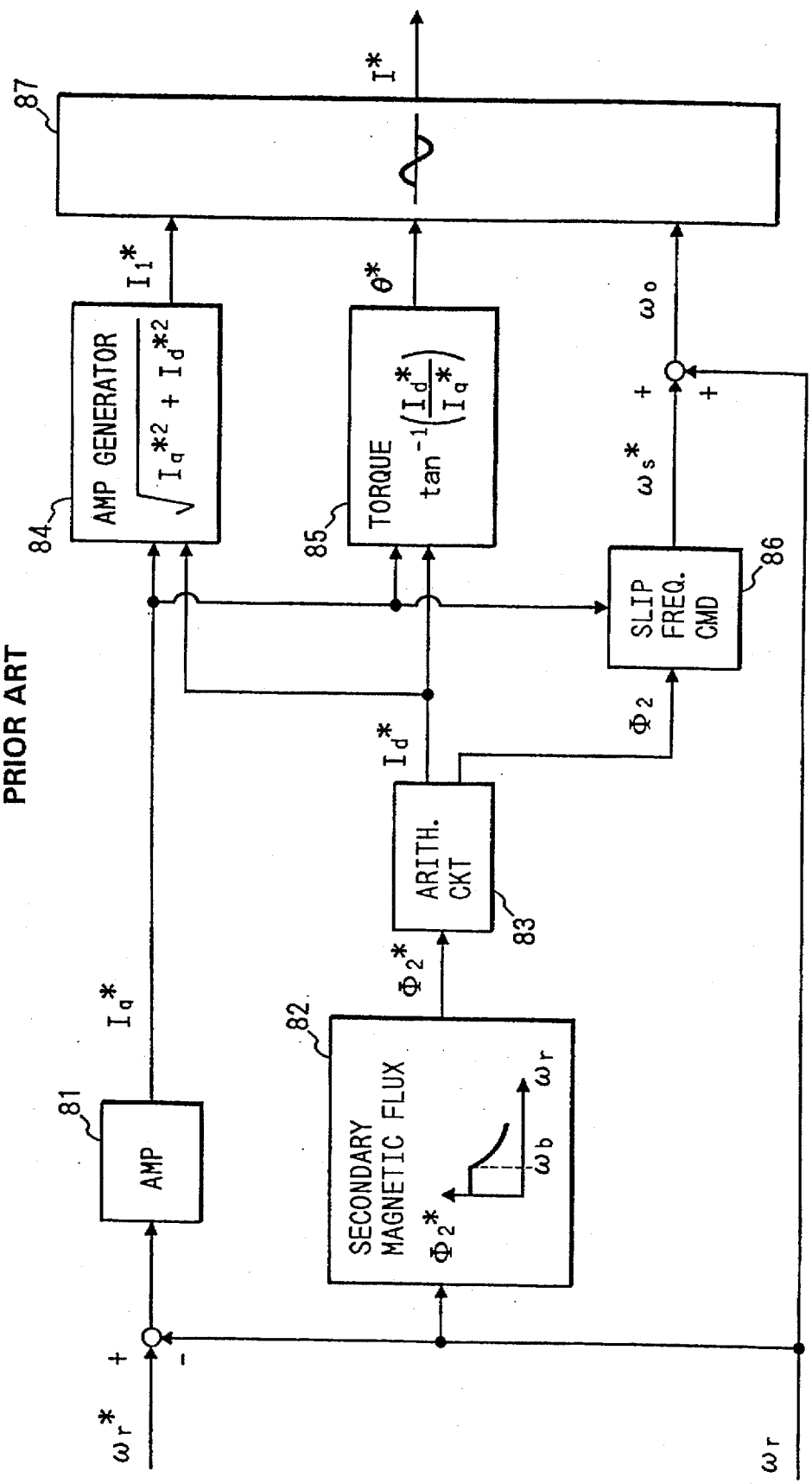
FIG. 26 is a vector control block diagram of the conventional inverter control apparatus for driving a motor.

FIG. 24 is an operation flowchart of the inverter control apparatus for driving a motor as the eighth embodiment of the invention. The flowchart of operation performed by the PWM gate shutting circuit 32 will now be described with reference to FIG. 24. First, an output signal from the PWM switching circuit 31 is checked at step 904 to automatically judge whether the fpwm is to be switched or not (the judging method is as described in embodiments 1 to 6 of the present invention). If the fpwm is not switched, a timer described later is reset at step 905. If the fpwm is switched at step 904, it is judged at step 906 whether the gate shutting timer has timed up to set value TG. If the timer has not timed up to TG, it is judged at step 908 whether the timer has timed up to TG/2. If the timer has not timed up to TG/2, the timer is caused to time up at step 910. If the timer has timed up to TG/2 at step 908, the fpwm is switched at step 909 and the execution proceeds to step 910. If the timer has timed up to TG at step 906, the gate ON signal is switched on at step 907.

According to the present embodiment when the motor is run at very high speed or with low noise, stable fpwm switching can be done without a motor current jump occurring at the switching of the fpwm.

In the present embodiment, while the vector-controlled inverter control apparatus was used by way of example for ease of understanding, the identical means can be installed in any other systems in which the PWM frequency is set to drive a motor.

In addition to the above disclosed individual embodiments, combinations of the features of those embodiments also can be achieved. No illustration of these combined embodiments is provided since one of ordinary skill would readily combine the illustrated and disclosed individual embodiments in accordance with the teachings that follow.

A ninth embodiment can comprise a combination of the second and sixth embodiments. In order to reduce heat generated when the motor is driven within a constant torque region (i.e., less than omega b), the combination of the second and sixth embodiments will make the fpwm variable in the constant torque region according to the load factor. This combination also provides the advantage that there is excellent noise reduction efficiency. A similar result is achieved from the combination of the second and seventh embodiments.

A tenth embodiment results from the combination of the third and sixth embodiments and also provides high noise reduction efficiency. In order to reduce heat generated when acceleration and deceleration are repeatedly and frequently carried out, the described combination in the tenth embodiment will make the fwpm variable in the constant torque region in accordance with a load factor. A similar result is achieved when the third embodiment is combined with the seventh embodiment.

An eleventh embodiment would result from the combination of the fourth and sixth embodiments and would serve to reduce the heat and noise generated during the driving in a position loop. As a result of the disclosed combination, the fwpm is made variable in the position loop in accordance with the load factor. A similar result is obtained when the fourth embodiment is combined with the seventh embodiment.

A twelfth embodiment would result from the combination of the third, fourth and sixth embodiments. As a result of the proposed combination, the noise that may result during the driving in the position loop where only the third and sixth embodiments are combined, and the noise that may result during acceleration and deceleration where only the fourth and sixth embodiments are combined, are both reduced. A similar advantage is achieved when the third, fourth and seventh embodiments are combined.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention.

What is claimed is:

1. An inverter control apparatus comprising a current detector for detecting the primary current of a motor driven by an inverter circuit, a speed detector for detecting the speed of said motor, and a pulse width modulation circuit for pulse-width-modulating said inverter circuit in accordance with the primary current detection value of said current detector and a primary current command value, said inverter control apparatus comprising constant torque-constant output PWM switching means for judging whether the motor speed detected by said speed detector is in a constant torque region or in a constant output region to switch the PWM frequency of said pulse width modulation circuit and to set the PWM frequency with the function of the motor speed in said constant output region.

2. The inverter control apparatus as set forth in claim 1, wherein said inverter control apparatus further comprises heat sink-ambient temperature difference PWM switching means for detecting the heat sink temperature and ambient temperature of said inverter apparatus to switch the PWM frequency of said pulse width modulation circuit according to a temperature difference.

3. An inverter control apparatus comprising:
    a current detector for detecting the primary current of a motor driven by an inverter circuit:
    a pulse width modulation circuit for pulse-width-modulating said inverter circuit in accordance with the primary current detection value of said current detector and a primary current command value; and
    a speed-position PWM switching means for judging whether the motor is in a speed control mode or in a position control mode to switch the PWM frequency of said pulse width modulation circuit.

4. An inverter control apparatus comprising:
    a current detector for detecting the primary current of a motor driven by an inverter circuit;
    a pulse width modulation circuit for pulse-width-modulating said inverter circuit in accordance with the primary current detection value of said current detector and a primary current command value; and
    a heat sink-ambient temperature difference PWM switching means for detecting the heat sink temperature and ambient temperature of said inverter apparatus to switch the PWM frequency of said pulse width modulation circuit according to a temperature difference.

5. An inverter control apparatus comprising:
    a current detector for detecting the primary current of a motor driven by an inverter circuit;
    a pulse width modulation circuit for pulse-width-modulating said inverter circuit in accordance with the primary current detection value of said current detector and a primary current command value;
    an acceleration/deceleration-steady state PWM switching means for judging whether the motor is executing an acceleration/deceleration operation or a steady-state operation to switch the PWM frequency of said pulse width modulation circuit; and
    a heat sink-ambient temperature difference PWM switching means for detecting the heat sink temperature and ambient temperature of said inverter apparatus to switch the PWM frequency of said pulse width modulation circuit according to a temperature difference.

6. The inverter control apparatus as set forth in claim 5, wherein said inverter control apparatus further comprises speed-position PWM switching means for judging whether the motor is in a speed control mode or in a position control mode to switch the PWM frequency of said pulse width modulation circuit.

7. The inverter control apparatus as set forth in claim 1, wherein said inverter control apparatus further comprises switching means for selecting between fixing and varying the PWM frequency of said pulse width modulation circuit.

8. An inverter control apparatus comprising:

a current detector for detecting the primary current of a motor driven by an inverter circuit;

a pulse width modulation circuit for pulse-width-modulating said inverter circuit in accordance with the primary current detection value of said current detector and a primary current command value;

an acceleration/deceleration-steady state PWM switching means for judging whether the motor is executing an acceleration/deceleration operation or a steady-state operation to switch the PWM frequency of said pulse width modulation circuit;

switching means for selecting between fixing and varying the PWM frequency of said pulse with modulation circuit; and a speed-position PWM switching means for judging whether the motor is in a speed control mode or in a position control mode to switch the PWM frequency of said pulse width modulation circuit.

9. The inverter control apparatus as set forth in claim 8, wherein said inverter control apparatus further comprises switching means for selecting between fixing and varying the PWM frequency of said pulse width modulation circuit.

10. The inverter control apparatus as set forth in claim 3, wherein said inverter control apparatus further comprises heat sink-ambient temperature difference PWM switching means for detecting the heat sink temperature and ambient temperature of said inverter apparatus to switch the PWM frequency of said pulse width modulation circuit according to a temperature difference.

11. A method of controlling the operation of an inverter circuit for driving a motor comprising:

providing a primary current command value;

detecting the value of the primary current of the motor driven by said inverter circuit;

pulse-width-modulating said inverter circuit in accordance with said detected primary current value and said primary current command value;

judging a state of said motor operation; and switching the PWM frequency of said pulse width modulation step according to said judged state;

wherein said judging step comprises judging whether said motor is in a position control mode or a speed control mode.

12. A method of controlling the operation of an inverter circuit for driving a motor comprising:

providing a primary current command value;

detecting the value of the primary current of the motor driven by said inverter circuit;

pulse-width-modulating said inverter circuit in accordance with said detected primary current value and said primary current command value;

judging a state of said motor operation;

shutting off gates of said inverter circuit at a beginning of a predetermined period of time TG;

switching the PWM frequency of said pulse width modulation step according to said judged state at a time TG/2; and turning on the gates of said inverter circuit at the end of the predetermined period of time TG.

13. An inverter control apparatus comprising:

a current detector for detecting the primary current of a motor driven by an inverter circuit;

a pulse width modulation circuit for pulse-width-modulating said inverter circuit in accordance with the primary current detection value of said current detector and a primary current command value; and a user switching means for allowing a user to select between fixing and varying the PWM frequency of said pulse width modulation circuit.

14. The inverter control apparatus as set forth in claim 7, wherein said switching means is a user switching means which allows a user to make a selection.

15. An inverter control apparatus comprising:

a current detector for detecting the primary current of a motor driven by an inverter circuit;

a pulse width modulation circuit for pulse-width-modulating said inverter circuit in accordance with the primary current detection value of said current detector and a primary current command value;

an acceleration/deceleration-steady state PWM switching means for judging whether the motor is executing an acceleration/deceleration operation or a steady-state operation to switch the PWM frequency of said pulse width modulation circuit; and a user switching means for allowing a user to select between fixing and varying the PWM frequency of said pulse with modulation circuit.

* * * * *